US012647647B1

(12) United States Patent

Shimizu et al.

(10) Patent No.: US 12,647,647 B1

(45) Date of Patent: Jun. 2, 2026

(54) CINEMA-BASED CONTENT EXPOSURE ATTRIBUTION SYSTEM

(71) Applicant: ABCS INSIGHTS Inc., Kissimmee, FL (US)

(72) Inventors: Jerome Shimizu, Kissimmee, FL (US); Michael Sheng, Orlando, FL (US)

(73) Assignee: ABCS INSIGHTS INC., Kissimmee, FL (US)

( * ) Notice: Subject to any disclaimer, the term of this patent is extended or adjusted under 35 U.S.C. 154(b) by 0 days.

(21) Appl. No.: 19/193,561

(22) Filed: Apr. 29, 2025

(51) Int. Cl.
*H04N 21/442* (2011.01)
*H04N 21/414* (2011.01)

(52) U.S. Cl.
CPC . *H04N 21/44204* (2013.01); *H04N 21/41415* (2013.01)

(58) Field of Classification Search
CPC .................. H04N 21/44204; H04N 21/41415
See application file for complete search history.

(56) References Cited

U.S. PATENT DOCUMENTS

| | | | | |
|---|---|---|---|---|
| 10,019,731 | B1* | 7/2018 | Wu ..................... | G06Q 30/0246 |
| 2012/0072280 | A1* | 3/2012 | Lin ..................... | G06Q 30/0261 |
| | | | | 705/14.45 |
| 2012/0190386 | A1* | 7/2012 | Anderson ............... | G01S 19/14 |
| | | | | 455/456.3 |
| 2014/0046748 | A1* | 2/2014 | Nagarajan .............. | G06Q 30/02 |
| | | | | 705/14.1 |
| 2014/0289759 | A1* | 9/2014 | Nakano .............. | H04N 21/2541 |
| | | | | 725/31 |
| 2015/0317657 | A1* | 11/2015 | Boudville .......... | G06Q 30/0275 |
| | | | | 705/14.71 |
| 2016/0148123 | A1* | 5/2016 | Paleja ................. | G06F 3/04842 |
| | | | | 705/5 |
| 2018/0053208 | A1* | 2/2018 | Upstone ............. | G06Q 30/0245 |
| 2018/0260736 | A1* | 9/2018 | Yates .................... | H04L 67/535 |
| 2019/0172076 | A1* | 6/2019 | Wirasinghe ........ | H04N 21/8549 |
| 2023/0069840 | A1* | 3/2023 | Umezawa ............. | H04W 4/029 |
| 2024/0370899 | A1* | 11/2024 | Waldron ............ | G06Q 30/0246 |
| 2025/0069119 | A1* | 2/2025 | Fowles .............. | G06Q 30/0269 |
| 2025/0097212 | A1* | 3/2025 | Ihsanullah .......... | H04L 63/0442 |

\* cited by examiner

*Primary Examiner* — John W Miller
*Assistant Examiner* — Akshay Doshi
(74) *Attorney, Agent, or Firm* — SCHWEGMAN LUNDBERG & WOESSNER, P.A.

(57) ABSTRACT

Systems and methods are disclosed for attributing advertisement exposure in a cinema environment. A ticket event is accessed, indicating a user's purchase of a movie ticket at a specific location, screening room, and showtime. Advertisement schedule data is accessed to identify ads shown before the movie. The system determines that the user was likely present during the advertisement window using ticket information and supplemental data such as geolocation or concession purchase records. Post-exposure events—such as transactions, store visits, or digital engagement—are analyzed to detect behavioral changes following ad exposure. A correlation engine links the exposure to user behavior, enabling ad attribution, effectiveness scoring, and campaign optimization. The system supports privacy-preserving data handling and applies statistical or machine learning models to improve attribution accuracy. This enables advertisers to measure the impact of cinema-based advertisements and make data-driven decisions across physical and digital channels.

20 Claims, 8 Drawing Sheets

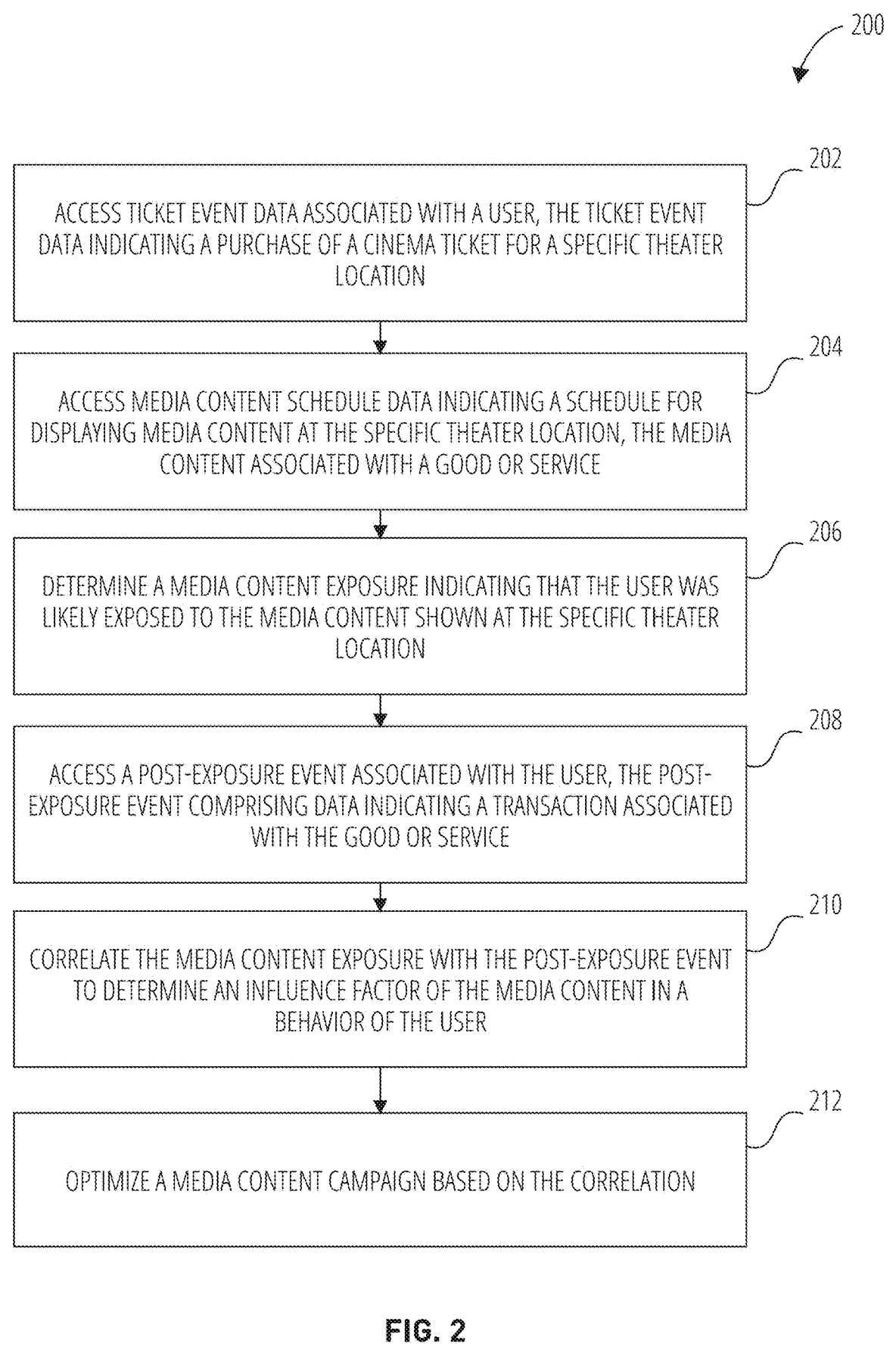

200

202

ACCESS TICKET EVENT DATA ASSOCIATED WITH A USER, THE TICKET EVENT DATA INDICATING A PURCHASE OF A CINEMA TICKET FOR A SPECIFIC THEATER LOCATION

204

ACCESS MEDIA CONTENT SCHEDULE DATA INDICATING A SCHEDULE FOR DISPLAYING MEDIA CONTENT AT THE SPECIFIC THEATER LOCATION, THE MEDIA CONTENT ASSOCIATED WITH A GOOD OR SERVICE

206

DETERMINE A MEDIA CONTENT EXPOSURE INDICATING THAT THE USER WAS LIKELY EXPOSED TO THE MEDIA CONTENT SHOWN AT THE SPECIFIC THEATER LOCATION

208

ACCESS A POST-EXPOSURE EVENT ASSOCIATED WITH THE USER, THE POST-EXPOSURE EVENT COMPRISING DATA INDICATING A TRANSACTION ASSOCIATED WITH THE GOOD OR SERVICE

210

CORRELATE THE MEDIA CONTENT EXPOSURE WITH THE POST-EXPOSURE EVENT TO DETERMINE AN INFLUENCE FACTOR OF THE MEDIA CONTENT IN A BEHAVIOR OF THE USER

212

OPTIMIZE A MEDIA CONTENT CAMPAIGN BASED ON THE CORRELATION

FIG. 2

CINEMA-BASED CONTENT EXPOSURE ATTRIBUTION SYSTEM

BACKGROUND

Content exposure technology measures whether and how users interact with content across various mediums, including digital, out-of-home, in-store, and broadcast channels. These systems estimate content reach and effectiveness. Content exposure technology plays a crucial role in analytics by tracking when, where, and how users encounter content across multiple platforms. This technology helps attribute conversions to specific marketing touchpoints, distinguishing between direct and indirect influences on user behavior.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 2 illustrates an example method for summarizing a process of attributing cinema-based content exposure to user behavior, according to some examples.

DETAILED DESCRIPTION

Figure 1:
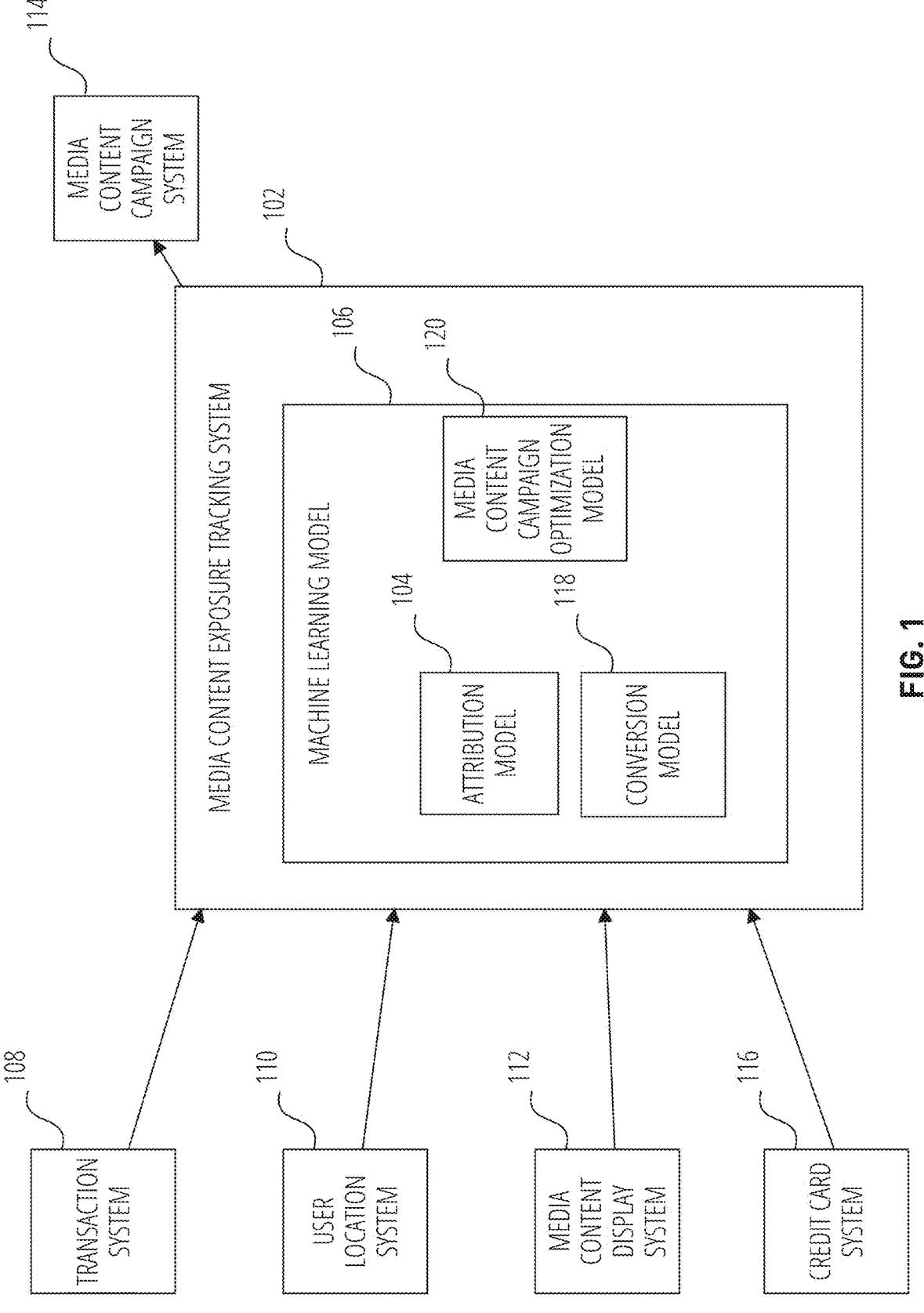
FIG. 1 illustrates an aspect of the subject matter in accordance with one embodiment.

Traditional attribution systems are particularly limited in the cinema environment, where there is no direct mechanism—such as pixels, cookies, or on-device tracking—to confirm that a specific user was exposed to a specific in-theater content (e.g., advertisements). Unlike digital environments where user interactions can be logged in real time, cinema advertisements, or ads, are shown to anonymous audiences without individualized tracking. Even when ticket purchases are known, traditional systems cannot link a specific ad shown in a particular auditorium to a specific individual or infer any post-viewing behavior. This lack of granularity and linkage renders most cinema advertising "blind" in terms of downstream conversion attribution.

Traditional attribution systems that rely on credit card or bank transaction data suffer from several structural limitations that hinder their ability to accurately measure advertising effectiveness. These systems generally record transactional activity at the merchant level, capturing basic details such as transaction amount, timestamp, and store location. However, they lack visibility into the specific items purchased, making it impossible to determine whether a transaction involved the advertised product or a completely unrelated item.

This absence of product-level detail forces advertisers to rely on indirect assumptions and probabilistic modeling. For example, if a user is exposed to an ad for a particular brand of cereal and later makes a purchase at a grocery store, traditional systems can confirm that a payment occurred at that store but provide no insight into whether the advertised cereal was part of the transaction. As a result, advertisers must infer product-level impact from aggregated merchant sales, leading to distorted metrics and weakened attribution confidence.

Credit card-based systems also struggle to handle cross-store and multi-product scenarios. If a user sees an ad at one store but later purchases the product at another retailer, the attribution chain is effectively broken. Likewise, in transactions involving multiple items, there is no way to determine which purchases were driven by advertising and which were routine or habitual. This ambiguity reduces the precision of return-on-ad-spend (ROAS) calculations and undermines the ability to optimize ad placement and creative strategy based on real product conversions.

Moreover, traditional systems lack the ability to track multi-touchpoint exposure. They offer no visibility into whether a user was exposed to ads across different channels—such as in-store signage, digital media, mobile apps, or connected TV—prior to purchase. Without this broader context, advertisers cannot determine which exposures contributed most to a purchase, nor can they properly evaluate the incremental value of cross-channel strategies.

A media content exposure tracking system is disclosed herein that addresses these technical limitations of traditional credit card-based attribution systems by offering granular, product-level insight, direct exposure-to-conversion correlation, and multi-touchpoint measurement capabilities. The media content exposure tracking system leverages ticket event data, detailed media content scheduling, and structured post-exposure behavior signals (e.g., geolocation visits, receipt-based purchases, app interactions) to infer exposure and attribute user actions with high confidence. For example, if a user buys a ticket for a 7:00 PM screening of Movie A in Auditorium 4, and the media content exposure tracking system knows that a particular advertisement was shown in that room at 6:55 PM, the media content exposure tracking system can reasonably infer exposure based on timestamp alignment.

This inference is further strengthened by the presence of validation signals—such as mobile geofencing data, concession stand purchases, or smart glasses feedback—and is then correlated with post-exposure events like a receipt showing a purchase of the advertised item. The system enables deterministic or probabilistic attribution in a setting where traditional systems offer none, allowing advertisers to measure campaign effectiveness in theaters with a level of precision previously unattainable.

Unlike legacy systems that only track the occurrence of a transaction at a merchant, this system is designed to determine whether a user was likely exposed to specific media content—such as a pre-show cinema advertisement—and whether that exposure influenced a subsequent behavior, such as a purchase or store visit.

The system significantly improves attribution accuracy by utilizing electronic receipt data and other structured interaction records that include detailed item-level information. These receipts may originate from point-of-sale systems, email confirmations, loyalty apps, or scanned ticket purchases, allowing the system to identify the exact product or service purchased, the time of transaction, and the location. This level of specificity enables deterministic matching between an advertisement and the associated post-exposure user behavior-something traditional credit card data alone cannot support.

In addition to item-level transaction granularity, the system incorporates exposure context by linking users' ticketing data to theater-specific media schedules. For example, if a user purchases a ticket to a particular movie at a known showtime in a specific auditorium, and the system accesses a media schedule that shows which ads played in that room before the movie, it can infer with high likelihood which media content the user was exposed to. This temporal and spatial mapping introduces a reliable method for tracking exposure without the need for invasive tracking technologies or embedded ad pixels.

Moreover, the system supports a multi-touchpoint attribution framework. Beyond the initial cinema-based exposure, the system can detect additional interactions with the advertised brand across other channels—such as website visits, app downloads, mobile engagement, or geofenced store visits. By aggregating exposure signals across multiple devices and platforms, and weighting their relative contributions, the system builds a more complete picture of the user journey. Traditional models, which typically focus on last-click attribution or single-point interactions, cannot account for this type of distributed influence.

The system leverages trained classifiers and statistical models to assign confidence scores to ad-exposure correlations, handle missing or ambiguous data, and adapt to shifts in user behavior over time. For example, if ticket data lacks precise entry timestamps, the system can use predictive models based on historical behavior patterns and sensor-derived presence signals (e.g., mobile geolocation, concession purchases, or smart glasses data) to fill gaps and improve exposure inference. Additionally, the system can continuously retrain its models to accommodate new content formats, emerging advertising channels, and evolving user engagement patterns.

Ultimately, this media content exposure tracking system replaces assumptions with data-driven correlation, transforming incomplete transaction signals into actionable insights. The system empowers advertisers and media buyers to quantify the real impact of theatrical advertising and other content placements, allocate marketing budgets with greater precision, and enhance campaign performance by identifying the specific touchpoints that drive conversion. This results in a more transparent, adaptive, and effective advertising ecosystem—one that is rooted in technical improvements across data fusion, behavioral modeling, and machine learning-powered attribution.

System Architecture

FIG. 1 illustrates an example system architecture 100 for attributing media content exposure to subsequent user behavior and optimizing media content campaigns accordingly, according to some embodiments. The system architecture 100 includes a media content exposure tracking system 102 that interfaces with various external data systems to ingest, process, and correlate disparate data sources-such as transaction records, user geolocation signals, media content scheduling, and payment instrument metadata. Through integrated modeling components including attribution, conversion, and campaign optimization models, the media content exposure tracking system performs sophisticated correlation and inference operations to assess the impact of media content exposures and drive actionable campaign adjustments.

The media content exposure tracking system 102 includes a machine learning model 106 that supports multiple submodels: an attribution model 104 configured to identify correlations between media exposures and subsequent user actions, a conversion model 118 trained to estimate the likelihood that a specific behavior represents a successful outcome, and a media content campaign optimization model 120 for adjusting future campaigns based on observed performance and user responsiveness.

The system is coupled with a variety of external systems, including:

A transaction system 108 that generates digital receipts, structured purchase logs, and the like;

A user location system 110 that comprises mobile geofencing, beacon-based movement detection, and the like;

A media content display system 112 such as a digital out-of-home (DOOH) signage, CTV logs, or theater scheduling data;

A credit card system 116 that generates financial transaction logs; and

A media content campaign system 114, which receives optimization recommendations or campaign adjustments from the tracking system 102.

The transaction system 108 represents one or more systems responsible for collecting, generating, or aggregating structured transaction data associated with user purchases. This system can include point-of-sale (POS) systems at retail environments, digital receipt generation platforms, third-party receipt aggregators, loyalty program logs, mobile payment processors, or banking APIs that provide visibility into user purchase behavior.

In some implementations, transaction system 108 generates or accesses receipt data in structured digital formats such as JSON, XML, CSV, or proprietary schemas. Each receipt record may include detailed line-item data such as product name, SKU, quantity, unit price, total cost, timestamp of purchase, merchant name, store location, payment method, and discount codes. In the context of cinema use cases, the receipt data may also include ticket purchases, concession stand transactions (e.g., popcorn or soda), and other related purchases occurring in or around the exposure venue.

The transaction system 108 transmits this receipt data to the media content exposure tracking system 102, either in real time or via periodic batch processing. The data transmission can occur via direct API (Application Programming Interface) calls, secure data feeds, file transfer protocols, or cloud-based sync mechanisms. Once received, this receipt data becomes part of the event-based interaction dataset processed by the tracking system 102.

The media content exposure tracking system 102 uses the receipt data to determine whether a user engaged in a post-exposure action that may correlate with a previously recorded media content exposure. For example, if a cinema patron was exposed to an ice cream advertisement prior to a film screening, and later made a purchase at an ice cream store, the transaction system 108 provides the digital evidence necessary to establish a conversion event. This data serves as a critical input into the attribution model 104 and conversion model 118 housed within machine learning module 106, enabling the system to score, weight, and refine the relationship between content exposure and user behavior.

The user location system 110 represents one or more systems capable of detecting and reporting user geolocation data in relation to physical venues or media content display environments. This system may include GPS modules embedded in user mobile devices, Wi-Fi triangulation networks, Bluetooth beacon infrastructures, in-app geofencing SDKs, venue-based check-in platforms, or sensor-based tracking systems (e.g., door entry logs, motion detection, or smart glasses).

The user location system 110 provides contextual spatial data to the media content exposure tracking system 102. This data includes timestamps and coordinates indicating the user's presence within or near a defined geofence associated with a media exposure zone—such as a cinema, retail outlet, or outdoor signage location. In some implementations, the location system further specifies which room or auditorium the user entered (e.g., Auditorium #3 at a specific theater), thereby allowing room-level granularity for 210 exposure estimation.

Geolocation data from user location system 110 is transmitted to the media content exposure tracking system 102 to help establish whether the user was likely present at the same time and place as the scheduled media content. The media content exposure tracking system can use this geolocation signal to confirm, refine, or validate inferences made based on ticket event data or other sources. For example, if a user buys a movie ticket in advance but fails to appear at the venue during the scheduled screening time, the absence of a geofence entry signal may reduce the confidence of inferred exposure. Conversely, corroborated location presence boosts attribution confidence and feeds into the attribution model 104 and conversion model 118 to refine exposure tracking and downstream behavior mapping.

The media content display system 112 comprises one or more systems responsible for delivering or logging the presentation of media content (e.g., advertisements, promotional content, branded content blocks) across physical or digital surfaces. This includes in-cinema ad scheduling servers, digital out-of-home (DOOH) ad controllers, connected TV (CTV) ad networks, streaming media platforms, and smart display systems in retail or entertainment environments.

The media content display system 112 generates media content schedule data, which includes timestamps, room identifiers, movie titles, and mappings of advertisement blocks to specific venues, rooms, or audience segments. For example, in the cinema context, the media content display system 112 stores that a pre-roll ad for an ice cream brand was scheduled to air at 6:55 PM in Auditorium 5, prior to the 7:00 PM showing of Movie A at Theater X. In some cases, media content display system 112 also stores metadata such as content format (e.g., video, static), brand sponsor, regional customization, or demographic targeting parameters (e.g., teen-targeted trailers).

The media content display system 112 transmits the advertisement schedule data to the media content exposure tracking system 102, which then uses it to infer when and where a particular user was likely exposed to an ad. This inference becomes a foundational part of the exposure signal used by the attribution model 104 to determine correlation strength and later campaign performance.

The credit card system 116 represents one or more systems that store, process, or aggregate payment transaction data from user credit or debit card accounts. This includes payment networks (e.g., Visa, Mastercard, AmEx), financial institutions, bank aggregators (e.g., Plaid, Yodlee), buy-now-pay-later (BNPL) platforms, and digital wallets (e.g., Apple Pay, Google Pay).

This media content exposure tracking system provides financial transaction log data to the media content exposure tracking system 102, which can serve both as an alternative to traditional receipt data and as a corroborating source of post-exposure activity. The data may include transaction timestamps, merchant names, transaction amounts, anonymized user identifiers, and payment instrument metadata—but may lack item-level granularity.

Credit card system 116 sends this transaction data to the media content exposure tracking system 102 to help determine:

Whether the user made a purchase following media exposure (conversion detection), Whether the transaction involved a merchant or brand associated with the media content, And whether this transaction aligns temporally and spatially with other user interaction signals.

This data feeds into the conversion model 118, which evaluates how likely it is that the observed financial activity constitutes a response to the media content exposure. When aligned with the exposure timestamp and product or brand attributes, these transaction signals enable attribution even when direct receipt data is unavailable, thus improving overall conversion coverage and system robustness.

The media content exposure tracking system 102 is the central processing and analytics engine responsible for receiving, integrating, and analyzing data from various input systems (e.g., transaction system 108, user location system 110, media content display system 112, credit card system 116) to infer exposure to media content, detect post-exposure behaviors, and generate actionable insights for advertising optimization.

The media content exposure tracking system 102 includes internal subsystems that perform various functions, including user-level correlation, machine learning-driven modeling, campaign feedback loops, and attribution scoring. Upon receiving data from upstream sources, the media content exposure tracking system synchronizes timestamps, matches user identifiers (e.g., hashed IDs, device IDs), and resolves discrepancies across structured and unstructured datasets. The media content exposure tracking system can function in real-time or batch modes and supports both deterministic and probabilistic attribution models.

The media content exposure tracking system 102 outputs metrics such as inferred media exposure events, conversion events, attribution scores, and performance insights, which can be used by the media content campaign system 114 to adjust ongoing or future campaigns. These outputs can also be visualized in advertiser dashboards, used to re-rank audiences for targeting, or passed into external marketing systems via APIs.

The machine learning model 106 is responsible for automating exposure estimation, conversion prediction, and campaign optimization decisions using historical and real-time data. The machine learning model 106 is trained on large datasets that include past exposure records, transaction outcomes, location data, audience segment behaviors, and campaign performance logs.

The machine learning model is adaptive—it is continually retrained based on new data and can account for changes in user behavior, media delivery formats, and market conditions. In some cases, the machine learning model operates in real-time, scoring new exposure-conversion pairs as they arrive. In other implementations, it performs batch analysis on cohorts of users to determine which audience segments respond best to particular media placements.

The machine learning model 106 comprises specialized submodules, including the attribution model 104, the conversion model 118, and the media content campaign optimization model 120, each of which is described in more detail below.

The attribution model 104 is a subcomponent of the machine learning model 106 that analyzes correlations between media content exposure and post-exposure behavior (e.g., purchase, store visit, website engagement). It ingests structured data from receipt systems, location feeds, and media schedule logs and applies statistical and AI-based models to determine whether a media content impression likely contributed to a subsequent behavior.

The attribution model 104 computes attribution scores that reflect the likelihood of a causal relationship between a given media exposure and a behavioral outcome. in some examples, these attribution scores are weighted based on recency, user behavior history, geolocation proximity, exposure frequency, or ad creative features. The machine learning model supports single-touch and multi-touchpoint attribution logic, enabling it to analyze linear, time-decay, and weighted attribution scenarios.

These outputs inform advertisers about which ads, delivery formats, audience profiles, or venues are most effective—allowing them to reallocate resources and improve campaign efficiency.

The media content campaign optimization model 120 is a decision-making submodule that consumes attribution and conversion data to generate actionable recommendations for ad campaign adjustment. This includes targeting adjustments (e.g., changing demographics or DMA regions), budget reallocation (e.g., prioritizing high-performing screens or movie genres), creative iteration (e.g., updating ad content), or frequency caps.

The machine learning model 120 integrates historical performance data, real-time engagement feedback, and machine learning-based forecasts to simulate alternative campaign strategies and project expected outcomes. In some cases, the machine learning model automatically feeds these optimizations back into the media content campaign system 114, triggering real-time bidding changes, content substitutions, or scheduling updates.

For example, if a pre-roll ad in family movies results in high conversion rates for a snack brand, but low performance in action movies, the machine learning model can reassign more ad inventory to the family segment and reduce spend in less responsive categories.

The conversion model 118 is a specialized machine learning module responsible for detecting, confirming, and quantifying user behaviors that occur after exposure to media content. These behaviors include in-store purchases, online engagements, app downloads, coupon redemptions, or store visits, and can be derived from receipt data, credit card logs, geofencing systems, or digital interaction signals.

The conversion model 118 applies statistical classifiers and confidence scoring algorithms to determine whether a user action likely represents a true conversion event attributable to a media exposure. It filters out habitual purchases and non-influenced behaviors, enabling more accurate ROI calculations and brand performance metrics.

The conversion model 118 works in tandem with the attribution model 104. While the attribution model identifies exposure-event pairings, the conversion model refines the interpretation of whether those events meet the criteria for conversion based on timing, location, and user history. Together, they ensure that only high-quality, attributable conversions are fed into the optimization pipeline.

The media content campaign system 114 is a downstream component that receives optimization signals and strategic recommendations from the media content exposure tracking system 102. Based on these recommendations, the media content campaign system 114 updates, manages, and deploys media content campaigns across various display environments, including cinema screens, digital-out-of-home (DOOH) networks, mobile platforms, and connected TV systems.

The media content campaign system 114 is responsible for executing decisions made by the campaign optimization model 120, such as:

Adjusting media content schedules: For example, reallocating ad inventory across different movies, showtimes, or geographic locations based on observed conversion rates.

Targeting refinement: Updating demographic, behavioral, or contextual targeting rules for future media content delivery, such as shifting focus toward youth audiences if that group demonstrated higher engagement.

Frequency and budget control: Modifying exposure frequency caps per user or increasing budget for high-performing segments, including reallocating ad slots to top-performing screens or titles.

Creative rotation: Replacing underperforming media content with alternate creatives, such as refreshing an advertisement shown before a family movie screening if it shows low engagement.

In some examples, the media content campaign system 114 interfaces with external cinema content management platforms, ad servers, and digital signage controllers to implement these updates in real time or near real time. In some examples, the media content campaign system 114 also logs and stores campaign performance data, which is later fed back into the media content exposure tracking system 102 for continuous learning and iterative optimization.

In some embodiments, media content campaign system 114 maintains a campaign configuration database that stores metadata for each campaign, including:

Ad content IDs and versions

Associated goods or services being promoted

Scheduled time blocks and movie room identifiers

Expected audience segments

Performance thresholds for automatic modifications

By working in tandem with the attribution model 104 and campaign optimization model 120, the media content campaign system 114 helps close the feedback loop-turning raw behavioral signals into actionable advertising decisions and dynamically improving outcomes over time. It ensures that media content is not only effectively delivered but also continuously aligned with real-world user responses captured across physical and digital environments.

Cinema-Based Advertisement Exposure Attribution

FIG. 2 illustrates an example method 200 for attributing cinema-based advertisement exposure to user behavior, according to some examples. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

At block 202, a system, such as the media content exposure tracking system 418 accesses ticket event data associated with a user. The ticket event data can indicate a purchase of a cinema ticket for a specific theater location. This ticket event data serves as the foundation for inferring whether the user was present in a theater environment where media content—such as a pre-show advertisement—was shown.

The system can access ticket event data from a wide variety of sources, including direct integrations with cinema chains' point-of-sale (POS) systems, third-party movie ticketing platforms, and mobile wallet providers that store digital tickets. In some cases, the system retrieves ticket event data from email parsing systems that extract structured details from digital receipts or confirmation emails sent by theaters.

In some examples, the system collects data from loyalty program databases linked to specific movie theater brands, which log ticket purchases at the user level. Additionally, some users may submit scanned images of paper tickets through user-facing apps, and the system uses optical character recognition (OCR) to convert this information into structured data.

In some embodiments, the system obtains data via direct integration with the cinema's ticketing system, via API access to a partner service (e.g., Fandango, Atom, or AMC), or indirectly through receipt scanning, email scraping, or loyalty program logs that confirm the purchase of a movie ticket.

In some examples, the ticket event data includes structured metadata such as:

The movie title and unique identifier;
The cinema or theater chain name (e.g., Regal, Cinemark, AMC);
The specific theater location or address;
The screening room or auditorium number;
The showtime and date of the scheduled movie;
Seat assignment, if applicable; and/or
Payment method or loyalty account used to purchase the ticket.

In some cases, the ticket event data includes not only the theater location and timestamp of the movie showing, but also a specific movie room identifier or auditorium number where the film was screened. The media content exposure tracking system can use this data to link a user's ticket purchase to a particular room within the theater complex. Because pre-roll advertisements may vary by room, screening, or film type, associating a ticket to a specific auditorium enhances the granularity of exposure detection and enables a more precise determination of which ads were shown to which viewers.

The system links the ticket purchase to a specific user using an anonymized identifier such as a hashed email address, mobile account ID, loyalty program ID, or encrypted payment token. This linkage enables the system to attribute exposure at the user level, not just in aggregate.

Figure 3:
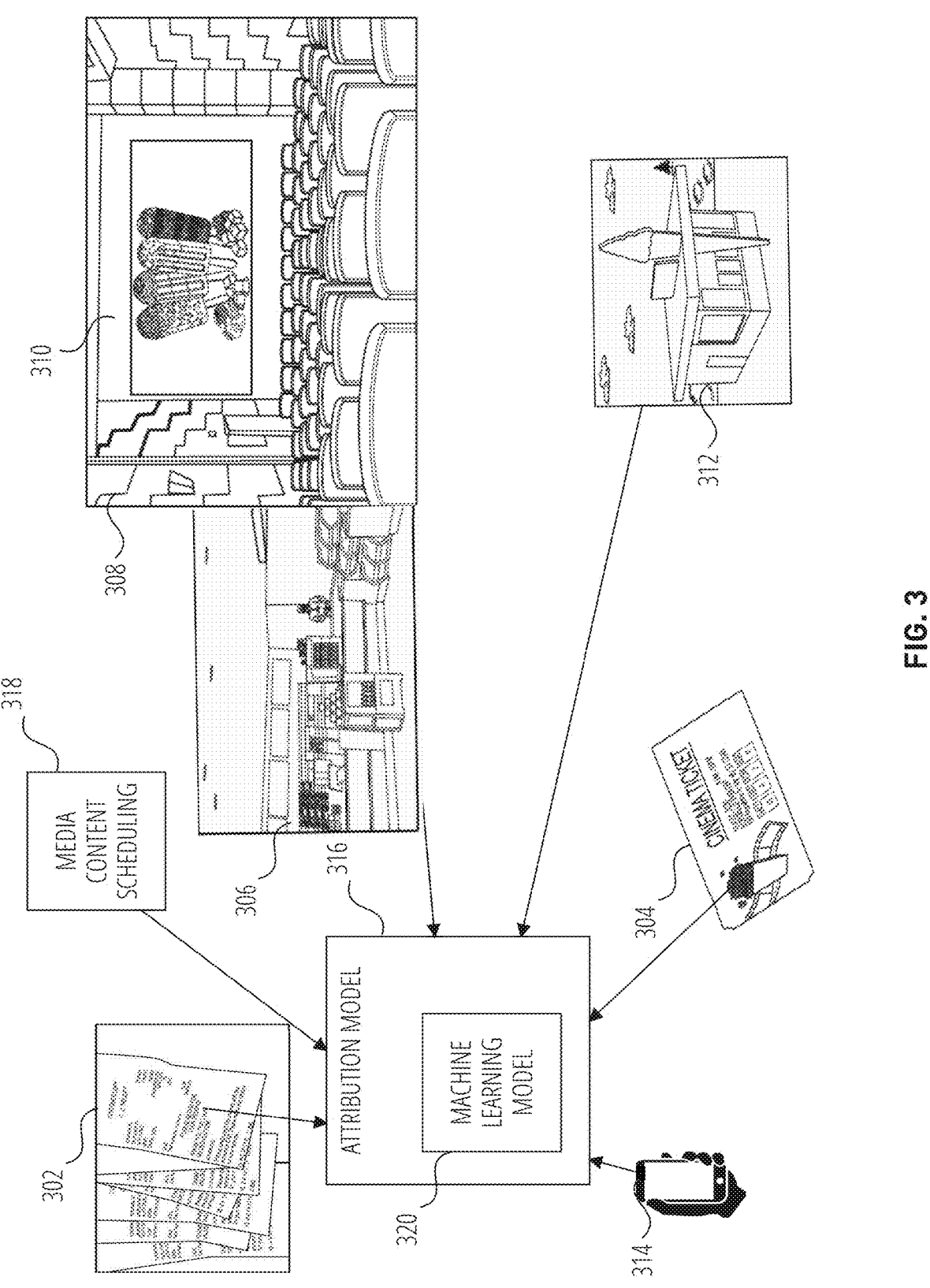
FIG. 3 illustrates an example system architecture for tracking media content exposure in a cinema environment and attributing post-exposure behavior to that exposure, according to some examples.

FIG. 3 illustrates an example system architecture for tracking media content exposure in a cinema environment and attributing post-exposure behavior to that exposure, according to some examples. As shown, the system accesses multiple sources of user interaction and environment data to determine whether a user was likely exposed to a media content item, such as an advertisement displayed before a movie screening, and subsequently links that exposure to a post-exposure transaction event.

The figure includes (which can include ticket event data) receipt data 302, which may include a digital or physical receipt confirming purchase of the user's cinema ticket 304. The mobile phone 314 may be used to scan the receipt.

The movie theater 308 is the venue where the user attends a scheduled screening, and movie theater screen 310 represents the presentation of the media content item (e.g., an ice cream advertisement) to the user prior to or during the film.

Returning to FIG. 2, at block 204, a system, such as the media content exposure tracking system 418, accesses media content schedule data indicating a schedule for displaying media content at the specific theater location. The media content can be associated with a good or service.

The system uses the media content schedule data to map the ticketed movie showing to the exact media content—such as trailers, pre-roll advertisements, or sponsored messages—that were scheduled to be played prior to or during that specific screening.

The media content exposure tracking system xxx may access this schedule data from several sources. In some embodiments, the system is directly integrated with a cinema chain's media scheduling software, which centrally manages pre-show content across theater locations and auditoriums. In other cases, the schedule data is obtained through content delivery partners or digital cinema distribution networks responsible for provisioning and sequencing media content across different theaters. The system can interface with third-party ad placement services or studio partners who track which advertisements are scheduled to run in front of which films, based on contractual targeting parameters such as genre, MPAA rating, or expected audience demographic.

In some examples, the media content schedule data include detailed metadata for each media content item, including but not limited to:

The name and identifier of the advertisement or media content item;
The associated brand, good, or service being promoted;
The time slot of the content's scheduled appearance (e.g., 7:15 PM-7:17 PM);
The auditorium or movie room number in which the media content was shown;
The movie title associated with the screening;
The theater location (e.g., chain name, address, location ID); and/or
Targeting parameters or campaign ID (e.g., "Ad #3450-Shown before PG-rated family films only").

In some examples, the system ingests programmatic logs from in-theater media servers that confirm delivery and playback timestamps of scheduled content. The system uses the delivery and playback timestamps of scheduled content verify that the scheduled media was actually played, reducing the risk of false-positive exposures. In theaters with digital projection systems, such logs can be granular to the second, detailing the actual runtime and any substitutions or missed content.

Where multiple ads are scheduled for a given screening, the system retrieves an ordered list of media content items and associate each with their scheduled playback timestamp. This enables downstream processes—such as exposure confidence scoring or attribution weighting—to account for the relative placement and duration of each ad.

In some cases, a single media content item is scheduled across multiple showings or theaters. The system uses campaign metadata to determine the breadth of the media content's reach, and to distinguish between localized campaigns (e.g., region-specific ads) and national campaigns (e.g., a movie trailer or product advertisement shown at all locations of a cinema chain for a given week).

By linking the ticket event data to the media content schedule data, the system can infer with high precision whether the user had an opportunity to view a specific advertisement tied to a good or service. The system uses this to calculate media exposure likelihood and support subsequent correlation with post-exposure user behavior.

In some cases, the advertisement schedule data also includes dynamic targeting parameters, indicating whether the media content block was personalized based on expected audience demographics. For instance, if a theater room is expected to be primarily filled with teenagers (e.g., based on a screening of a youth-targeted movie), the ad server substitutes a standard ad block with one tailored to that demographic. The system later correlates not only ad exposure by room, but also by inferred audience profile, which can improve downstream campaign optimization.

In certain cases, the media content schedule includes regional targeting constraints or geographic rotation rules, which allow the same film in different cities to be preceded by different advertisements. This may be particularly relevant for national brands that tailor their ad messaging or product offerings by market. The system leverages this detail to ensure that attribution analyses are scoped to the appropriate designated market area (DMA) or regional cohort.

In some cases, the media content schedule includes sponsored segment metadata, which denotes when the ad content was presented in a branded content wrapper or thematic segment (e.g., "Presented by Brand X"). The system uses this metadata to attribute exposure to discrete ad spots and to thematic promotional formats that span multiple media content units.

As shown in FIG. 3, the system incorporates media content scheduling 318 data to determine what advertisements were presented at the time and location of the user's ticketed movie. For instance, movie theater 308 and screen 310 represent the physical location of the user's visit, and in some cases, also represents the delivery environment for a specific media content item, such as an ice cream advertisement. To understand which media content was actually shown to the user, the media content exposure tracking system xxx accesses media scheduling data from external systems as explained above.

Returning to FIG. 2, at block 206, the media content exposure tracking system xxx determines a media content exposure indicating that the user was likely exposed to the media content shown at the specific theater location. In some cases, the media content exposure tracking system xxx determines that the user was likely exposed to a specific media content item—such as a pre-roll advertisement for a product or service—based on one or more of: spatial, temporal, and contextual signals associated with the user's ticket event data, location history, and environmental confirmation mechanisms. This inference is critical in environments like cinema theaters where direct pixel-based confirmation of ad delivery and consumption is not technically available.

In some embodiments, the system compares the timestamp of the ticket entry or the scheduled showtime to the start time of the scheduled media content block. For example, if a pre-roll advertisement was scheduled to play at 6:55 PM and the movie began at 7:00 PM, and the user's ticket indicates entry for the 7:00 PM showing, the system infers that the user was likely present during the ad block window. The system then applies this timestamp comparison to determine a baseline indicator of potential exposure.

In some cases, the system incorporates geofencing data to strengthen the exposure inference. This may include mobile device location logs, which track when the user entered the physical theater location (e.g., via GPS, Bluetooth beacons, or Wi-Fi triangulation), or internal cinema systems that track user presence via in-app check-ins or digital ticket scans. If geofence data confirms that the user's mobile device entered the cinema complex or the relevant theater room during the ad block window, the likelihood of ad exposure increases. These entry logs may be sourced from the user's own device or from the cinema's internal tracking systems.

In some cases, to infer exposure or to further validate in-theater presence, the system incorporates device-level sensor data, such as ambient light sensors, acoustic monitoring (e.g., microphone recognition of the theater audio track), or smart glasses equipped with scene detection. For example, smart glasses may detect that the user was in a darkened room at the time of the advertisement or recognize visual content on-screen that matches a known advertisement. These signals can supplement the geolocation and ticket data to provide a higher-confidence assessment of real-world exposure, particularly when the timestamp or geofence alone leaves some ambiguity.

In some cases, cinemas use Bluetooth beaconing, NFC check-ins, or Wi-Fi MAC ID detection. These can be linked to anonymized device IDs, allowing the system to cross-check ticket events with environmental presence logs from the theater's internal IoT infrastructure.

In some cases, the system validates user presence using in-theater activity data, such as concession stand purchases. For instance, a receipt for popcorn or soda purchased within the same window as the scheduled screening can reinforce that the user was not only ticketed for the show but present at the theater on that date. This is especially relevant when tickets were bought in advance and actual attendance on the day of the show is uncertain.

Returning to FIG. 3, the figure further illustrates how purchases within the theater such as within a geofenced area (e.g., concession stand data 306) may be used by the media content exposure tracking system to reinforce the likelihood that the user was present at the theater during the scheduled screening. In some embodiments, the system accesses a receipt or point-of-sale confirmation indicating that the user purchased an item—such as popcorn, a beverage, or candy—at or near the time of the movie showing.

This concession purchase acts as an additional signal of in-theater presence, especially in cases where the cinema ticket was purchased well in advance and user attendance on the day of the show is uncertain. By aligning the timestamp of the concession purchase with the scheduled showtime and media content block, the system increases its confidence that the user was physically present and likely exposed to the displayed media content.

In some cases where multiple screening rooms exist within a theater, the system links the ticket event to a specific auditorium or movie room identifier, which itself is mapped to a scheduled ad block. For example, if Ad X is scheduled only in Auditorium 3 for the showing of "Movie A" at 7:00 PM, and the ticket data shows the user was assigned to Auditorium 3 for "Movie A," the system concludes exposure to Ad X is likely. Even without precise time-of-entry data, the alignment of movie title, room number, and scheduled content supports a strong inference of exposure.

In some cases, the system considers product placements or brand integrations within the movie itself as a form of media content exposure. For example, if a soft drink brand is featured prominently in a scene, and the user was present for that film screening, the system could log a latent exposure event that may later be linked to downstream product interactions or purchases.

Because there is no pixel, tag, or embedded tracking mechanism available for media shown in physical theaters, the system combines these diverse data points—ticket purchase, movie schedule, room mapping, geolocation, in-theater activity, and sensor-based presence signals—to construct a probabilistic exposure profile. This approach allows the system to compensate for the offline nature of the ad environment and still perform attribution-level inference at the individual user level.

In some cases, the system compares a user's longitudinal location history to known patterns of movie-going behavior. For example, if the user's device is regularly detected at a specific theater on Friday nights, and the ticket data shows a Friday night movie ticket, the system assigns a higher confidence score to that event being attended.

If the user has a theater app installed, the system may look for app open events close to showtime, digital ticket activation, mobile seat check-in, or the like as a factor of exposure to the media content items.

At block 208, the media content exposure tracking system accesses a post-exposure event associated with the user. The post-exposure event can a transaction associated with the good or service.

The post-exposure event may include a purchase transaction involving the advertised product, a visit to a physical location associated with the brand (e.g., a quick-service restaurant or retail store), or a digital engagement (e.g., app download, coupon redemption, or website visit). For example, if an ice cream brand advertises before a movie screening, and a few days later receipt data indicates that the user made a purchase at that ice cream shop, this post-exposure event forms the basis of inferring an influence or conversion.

The system may access this data via integrations with third-party receipt aggregation platforms, banking APIs, credit card transaction feeds, loyalty program logs, or even scanned receipts submitted by the user through mobile applications. In some cases, the post-exposure event is sourced from direct point-of-sale integrations, such as retailer systems that report real-time purchase data back to ad attribution partners. The event may include structured fields such as product identifiers (e.g., UPC, SKU), store or merchant name, timestamp of transaction, price, and payment method.

Importantly, the post-exposure event may be associated with the same user that the ticket event and inferred exposure are tied to. The system may identify this linkage through an anonymized identifier, such as a hashed email, phone number, device ID, loyalty program ID, or payment token. This ensures privacy while still allowing for deterministic or probabilistic matching across datasets. In some cases, the system aggregates multiple post-exposure events to assess repeated engagement or brand loyalty—especially in categories where conversion may take place over a longer horizon (e.g., insurance sign-ups, QSR visits, or follow-up purchases).

At block 210, the media content exposure tracking system correlates the media content exposure with the post-exposure event to determine an influence factor of the media content in a behavior of the user.

In some embodiments, the media content exposure tracking system accesses structured receipt data associated with the user to determine whether a purchase was made for the good or service promoted in the media content. The system may analyze timestamped transaction records—such as digital receipts from point-of-sale systems, loyalty program databases, or mobile payment logs—to identify purchases occurring within a defined window after the user attended the movie screening. For instance, if an ice cream advertisement was shown before a 7:00 PM movie screening, and a receipt indicates that the user purchased that brand of ice cream two days later at an ice cream store location 312 that is external to the theater location, the system correlates this post-exposure event with the prior ad exposure using an attribution model 316. This enables the system to attribute user behavior to prior media exposure, even when a delay exists between the impression and the transaction.

The use of receipt data provides strong attribution evidence because it includes product-level details, store location, and purchase time. These attributes allow the system to distinguish between immediate conversions (e.g., purchases at the cinema concession stand) and delayed conversions (e.g., retail purchases at unrelated third-party locations), enhancing the precision of the inferred influence factor.

In some cases, the system detects a conversion event through receipt data reflecting a purchase that occurred at a third-party location separate from the theater where the media content was presented. For example, the user may have viewed an advertisement for an ice cream brand at the cinema but made a subsequent purchase at a local grocery store, convenience store, or franchise outlet of that brand. The system accesses receipt data across multiple merchants or partners, and upon identifying a match to the advertised product or service, correlates the receipt data with the prior exposure event at the cinema.

This correlation enables attribution in real-world scenarios where the point of sale is unrelated to the media exposure venue. This also strengthens measurement for products with broad distribution footprints, where post-exposure purchases may occur outside the cinema but still reflect advertising influence. The system's ability to support multi-merchant data integration enhances its flexibility in tracking cross-location and cross-channel conversions.

In some embodiments, the system accesses geolocation signals from a user's mobile device to determine whether the user visited a physical location associated with the advertised good or service. For example, if an ad for a quick-service restaurant (QSR) was shown before the movie, and the user's device is later geofenced entering that QSR location within 48 hours of the screening, the system interprets this visit as a post-exposure behavioral signal.

The use of geolocation-based store visit data provides a non-transactional, yet meaningful, signal of user interest or engagement. It is especially useful in cases where purchases are made without digital receipts or where privacy constraints prevent access to transactional data. Spatial proximity and timing help the system infer intent and potential conversion, even when the actual transaction cannot be directly observed.

In some implementations, the system analyzes browser history or in-app engagement data to detect user actions indicating interest in the advertised good or service. For instance, after being exposed to a trailer or pre-roll ad for a new ice cream flavor, the user may search for the brand online, visit the brand's website, or engage with a related mobile app. The system monitors such digital behavior—via integration with advertising platforms, app analytics providers, or browser plug-ins—and links it to the prior cinema-based media content exposure.

This form of digital engagement data serves as a proxy for intent and consideration, even if no physical transaction takes place. The system may apply probabilistic scoring or thresholds (e.g., frequency of search terms, dwell time on brand pages) to determine whether the digital activity qualifies as a meaningful post-exposure event. This approach broadens the system's capacity to track diverse user responses to media content beyond traditional purchases.

The media content exposure tracking system correlates the media content exposure with the post-exposure event to determine an influence factor of the media content in a behavior of the user. This correlation step establishes whether a user's observed behavior—such as a purchase, store visit, or digital engagement—was likely influenced by a previously recorded exposure to an advertisement at the cinema.

To perform this correlation, the system integrates data streams from multiple and/or non-communicating systems: media content schedule logs, ticketing and theater metadata, and post-exposure behavioral signals (e.g., purchase records, geolocation traces, app events). Each data type typically uses its own schema, naming conventions, and formats. As a first step, the system normalizes the datasets into a unified schema using field mapping (e.g., mapping "product_name" in ad metadata to "item_description" in receipt data), timestamp standardization (e.g., ISO 8601 formatting), and entity resolution (e.g., resolving "AMC LA #873" to "AMC Hollywood Boulevard"). This harmonization allows the system to align exposure and outcome events based on time, location, product category, and user identifier.

The correlation model may apply one or more statistical and machine learning approaches to assess the likelihood of causal influence (as further described herein). For instance, the system can compare the purchase time of a product to the timestamp of the media content exposure event. If a user watched a pre-movie ice cream ad on April 4th at 7:00 PM, and a matching receipt or location visit occurs on April 6th, the system calculates a temporal proximity score. In parallel or series, the system evaluates spatial proximity (e.g., whether the post-exposure transaction occurred near the original theater), semantic similarity of product names (e.g., using NLP to match "Brand X Chocolate Cone" to "Brand X ChocoCone"), and even behavioral factors (e.g., whether this user tends to act on similar ads in the past).

In some embodiments, the system uses a supervised machine learning model trained on historical exposure-conversion pairs to assign a probabilistic attribution score. Features used in the model may include time elapsed since exposure, match confidence between advertised and purchased product, store category match (e.g., ice cream advertised, ice cream parlor visited), user profile signals (e.g., high-converting vs. low-converting users), and contextual noise (e.g., competing promotions, seasonal trends). The model outputs a correlation confidence score that helps rank the strength of influence, with higher-scoring events feeding directly into ROI calculations, campaign optimizations, and audience re-targeting strategies.

In some cases, the correlation logic includes rule-based conditions alongside probabilistic models. For example: "If a user was exposed to Ad Y for Brand Z at 6:55 PM in Theater Room 4, and a receipt is logged for Brand Z within 72 hours and 5 miles of the theater, assign a correlation score of 0.9." If multiple exposures are recorded across touchpoints (e.g., cinema ad, mobile push, and website visit), the system performs multi-touch attribution by assigning weighted influence values to each touchpoint, such as 0.5 to cinema exposure and 0.25 each to mobile and web, depending on their temporal order and user behavior norms.

This attribution logic may also support contextual suppression or amplification. For instance, if a competing brand ran a high-volume campaign at the same time, the system may apply a dampening coefficient to reduce the influence score of the original ad, accounting for competitive noise in the advertising ecosystem. Likewise, if a user visited multiple locations selling the advertised item but only made a purchase at one, the system weights the most temporally or spatially aligned visit more heavily.

In some embodiments, the media content exposure tracking system incorporates a multi-touch attribution framework to evaluate how various advertising interactions, including the cinema-based media content exposure, contributed to a user's eventual purchase or engagement. Recognizing that modern users are often influenced by a sequence of ad impressions across different platforms and environments, the system identifies, tracks, and evaluates each of these touchpoints as part of a unified attribution path.

The system may detect additional advertising touchpoints that occur after the cinema exposure, such as mobile push notifications for the same product, social media ads, or connected TV (CTV) commercials. These touchpoints are logged with structured metadata-including timestamp, device or channel, ad content ID, and delivery context-which are then linked to the user via anonymized identifiers. The system compiles this cross-channel ad engagement history into a temporal graph structure, where each node represents an ad exposure and the edges represent the sequential path to conversion.

To determine influence, the system may apply attribution modeling techniques such as:

Time-decay attribution, where impressions that occur closer to the eventual conversion are given greater weight;

Position-based attribution, where the cinema ad may serve as the first touch (awareness) and is given a fixed share of the influence alongside the last-touch (conversion driver);

Algorithmic or data-driven attribution, where historical conversion paths are analyzed using machine learning to assign relative weights to each touchpoint based on statistical significance and behavioral correlation.

For example, if a user watches a 7:00 PM movie with a pre-roll ad for a snack brand, later receives a mobile coupon for that brand the next day, and finally views a CTV ad while watching content at home before making a purchase two days later, the system aggregates all these interactions. The correlation model evaluates the path and assigns influence scores to each exposure, attributing the final transaction across the multiple exposures based on recency, frequency, and prior conversion likelihood patterns.

These multi-touch correlation strategies enable the system to reflect real-world ad influence more accurately than traditional single-touch models. The framework also improves optimization by revealing which touchpoints contribute most effectively to conversions, allowing brands to refine channel allocation, timing, and messaging strategies for subsequent media content campaigns.

At block 212, the media content exposure tracking system optimizes or modifies a media content campaign based on the correlation. After the system has inferred a user's likely exposure to media content (e.g., a cinema advertisement)

and linked that exposure to a post-exposure behavior (such as a purchase, store visit, or digital engagement), the system uses this insight to improve the effectiveness of future campaigns in order to allocate resources more efficiently, target higher-performing channels, refine messaging, and expand reach among receptive audiences.

The optimization process may include several operations, such as:

Adjusting delivery strategies: Reallocating ad inventory to high-performing theaters, time slots, or movie genres based on conversion patterns.

Creative optimization: Replacing or iterating on ad creatives that underperform, while scaling successful versions.

Audience segmentation and targeting: Identifying user clusters—e.g., "engaged viewers" or "delayed converters"—and adjusting campaigns to reach similar users with tailored content.

Channel expansion: Extending high-performing cinema ads into other media (e.g., streaming, mobile, in-app) when multi-touch attribution models show strong downstream effects.

Demand forecasting: Adjusting inventory and ad spend for promoted goods or services based on increased conversion rates from cinema exposure.

Figure 4:
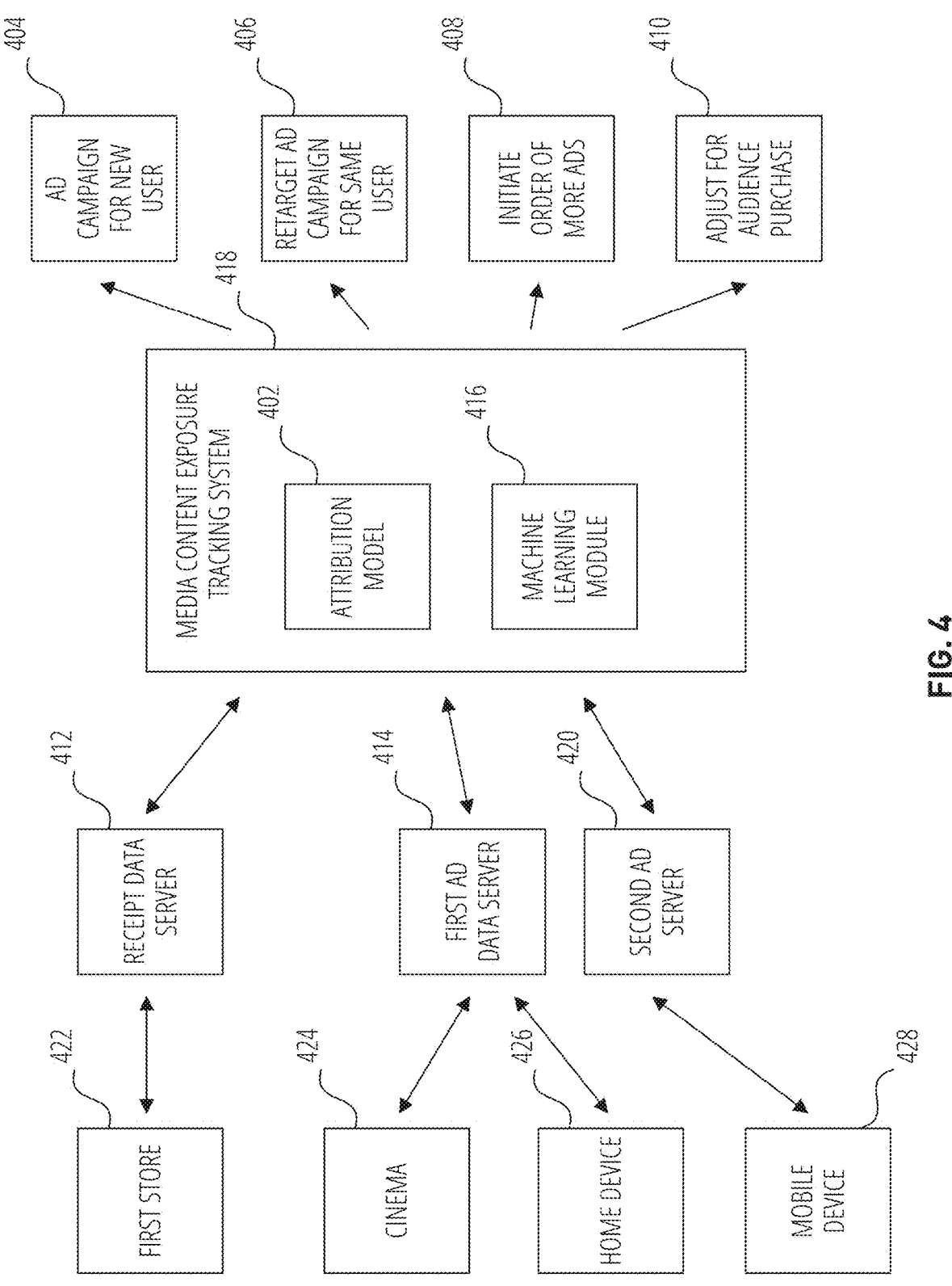
FIG. 4 illustrates an architectural diagram of the media content exposure tracking system 418, which integrates data from multiple sources to correlate user behavior with cinema-based media exposures and uses this insight to optimize ongoing and future media content campaigns, according to some examples.

FIG. 4 illustrates an architectural diagram of the media content exposure tracking system 418, which integrates data from multiple sources to correlate user behavior with cinema-based media exposures and uses this insight to optimize ongoing and future media content campaigns, according to some examples.

The first receipt data server 412 stores structured representations of post-exposure activity, such as purchase receipts. In the cinema context, this may include purchases made at ice cream stores, quick-service restaurants, or retail stores following a cinema advertisement. These receipts may be uploaded via user apps, aggregated through third-party platforms, or retrieved through loyalty programs or payment integrations.

The first ad data server 414 manages media content schedule data, capturing when and where specific cinema ads were shown. For example, it may store mappings between movie titles, theater rooms, and pre-roll advertisement blocks. Data from cinema content management systems, DOOH (digital out-of-home) servers, or campaign trafficking tools feed into this server to record metadata such as ad timing, product/service promoted, and associated creative ID.

The machine learning module 416 refines attribution logic based on historical performance and predictive modeling. The module learns from patterns across different theater locations, ad creatives, user segments, and follow-up behaviors to predict which media content exposures are most likely to lead to conversions, and may power personalization or real-time campaign adjustment engines.

The attribution model 402 compares exposure data with post-engagement signals—such as a purchase of the advertised good—to assign influence scores. It may use statistical models, time-decay weighting, or probabilistic inference to calculate attribution and flag both high- and low-performing media placements.

The first store 422 may include a store where a purchase occurred. This may represent a third-party merchant location where a user makes a purchase associated with the advertised good (e.g., an ice cream shop or QSR brand shown in the ad).

The cinema 424 is the physical venue where the user was exposed to the media content item. The cinema includes multiple screens, showtimes, and rooms—each with its own schedule of advertisements. The system links ticket data, showtime, and screening room information to map the user to a specific ad block.

The home device 426 includes other digital devices, such as connected TVs or smartphones, where the user may receive follow-up exposure to the same ad or brand after seeing the initial ad in the cinema. These secondary touchpoints reinforce messaging and may contribute to conversion via multi-touch attribution.

The mobile device 428 includes a device of that user that can include data representing smartphone-based ad exposures and engagement. The system may deliver retargeted ads, coupons, or branded content to users based on their cinema exposure. GPS or geofencing data from the mobile device may also confirm the user's presence at the cinema or at a subsequent retail location tied to the campaign.

The second ad server 420 aggregates data from mobile and CTV advertising platforms. It stores engagement records such as ad views, app opens, coupon redemptions, and interactions with brand campaigns initiated post-cinema exposure. This data is sent to the tracking system for attribution modeling alongside cinema exposure data.

The media content exposure tracking system 418 can be a central hub, receiving user-level exposure data from the cinema 424, digital engagement data from mobile devices 428 and home devices 426, and post-exposure purchase data from receipt data server 412. Using machine learning 416 and attribution modeling 402, the system evaluates which combinations of exposures result in conversions. It then uses these insights to optimize future media content campaigns, targeting the right users, improving media placements, and scaling ads that demonstrate the strongest influence on user behavior.

The system may initiate a new media content campaign 404 based on insights derived from the attribution model. After the media content exposure tracking system identifies correlations between cinema-based ad exposures and post-exposure behaviors, it may determine that a user previously went unnoticed in uncalibrated datasets (e.g., due to missing data or lack of previous conversion signals).

Once corrected exposure is inferred—perhaps based on presence in the movie room, geolocation data, and subsequent engagement—the system may add the user to a new target list. This allows the campaign to proactively engage newly identified or requalified users who show high potential for conversion.

For example, if a user was detected in a theater showing an ice cream ad and later made an app-based store visit without purchasing, they may now be added to a follow-up ad campaign for digital coupons or product trials.

The system may modify a campaign 406 for a user who was previously part of the campaign but now has updated behavioral signals. This retargeting process may be triggered by:

The user viewing an ad in a cinema but not converting immediately;

Receipt data showing interest in a related category;

Partial conversion behavior (e.g., store visit without purchase).

The system may trigger cross-channel retargeting such as:

A mobile push notification prompting them to visit a nearby store;

A CTV ad that reinforces the cinema messaging;

A loyalty app coupon linked to the advertised product.

Retargeting can be adapted based on time since exposure, location, or demographic insights gathered from the correlation model.

The system may initiate automatic or semi-automated ordering of additional ad inventory 408 (either in cinemas or digital channels) based on the performance metrics derived from the attribution model. For example, if the system detects that a particular cinema location or screening time (e.g., Friday night showings of action movies) produces strong conversion signals, it may place more orders for pre-roll ad slots at those high-performing placements.

If downstream receipt data shows a spike in purchases following certain ad creatives, the system may increase production or distribution of those creatives. For digital media reinforcement, the system may automatically schedule social media or mobile campaigns to run shortly after cinema ad exposure.

The system may refine and resegment target audiences 410 based on updated attribution outcomes. For instance, users who were once considered non-converters may now be placed in a "low-frequency, high-probability" segment after receipt data reveals repeat purchases linked to cinema ads. Certain demographic groups or geographic clusters that underperformed may be deprioritized, while newly identified "high-response DMAs" are given increased media weight.

In some embodiments, the optimization of the media content campaign is further informed by metadata included in the media content schedule, such as dynamic targeting parameters. For instance, if the advertisement schedule data indicates that a particular pre-roll block was tailored for a teen-oriented audience—e.g., scheduled before a PG-13 superhero movie—the system can analyze whether users associated with those showtimes and demographics exhibited higher rates of post-exposure activity. If so, the system can adjust future campaign strategies to increase the frequency of similarly targeted ad blocks for other screenings with comparable audience profiles. Conversely, if certain demographic-targeted segments underperform, the system can reallocate budget to more effective cohorts or recommend broader creative adjustments.

In other examples, the optimization process leverages regional targeting constraints found within the media content schedule data. If a brand campaign deploys different ad creatives across multiple designated market areas (DMAs), the system can evaluate performance on a region-by-region basis. For example, if an ice cream brand runs distinct ad versions in the Southwest and Northeast, the system can determine which regional variant resulted in higher conversion signals, such as receipt-based purchases, geofenced store visits, or digital engagement. These insights are then used to dynamically adjust regional media plans, either by promoting the higher-performing creative nationally or reallocating spend toward more responsive regions.

Additionally, when the media content schedule includes sponsored segment metadata—such as identifiers for branded content wrappers or thematic "presented by" moments—the system evaluates these special formatting elements alongside standard ad units. If sponsored segments demonstrate stronger conversion rates or elevated viewer retention, the system may recommend increasing the use of these content-integrated formats. This enables advertisers to explore campaign strategies that combine brand affinity storytelling with measurable sales impact, bridging the gap between entertainment content and performance marketing.

To address the technical challenges of correlating media content exposure in cinema environments with downstream user behavior, the system includes a machine learning model trained to perform key inference and optimization tasks. Traditional attribution systems are ill-equipped to handle delayed conversions, cross-channel behavior, or incomplete user data. In contrast, the machine learning architecture herein processes heterogeneous datasets—such as ticket event logs, media content schedules, mobile geolocation data, purchase records, and online engagement signals—to draw high-confidence inferences regarding ad exposure and its behavioral impact.

The system applies a machine learning model 320 to determine whether a user was likely exposed to a specific media content item, such as an advertisement displayed prior to a movie screening. This determination can be based on spatial, temporal, and behavioral inputs. For example, if the system detects a ticket event for a specific screening room and showtime (e.g., 7:00 PM in Auditorium 5), and the ad schedule confirms that Ad X played in that room at 6:55 PM, the model is trained to assess timestamp alignment with historical attendance patterns. If mobile geofencing data further confirms that the user's device entered the theater at 6:50 PM and remained for at least 20 minutes, the model assigns a high exposure likelihood score.

In the absence of precise geolocation data, the model may infer presence through auxiliary signals, such as a concession purchase timestamped within 10 minutes of the media content block or in-theater mobile device activity (e.g., Wi-Fi pings, Bluetooth beacon pings). In some cases, the system incorporates data from smart glasses or ambient sensor networks, detecting changes in environmental lighting or audio patterns to determine whether the user was inside the auditorium during ad playback. These multimodal features are fed into a classifier that continuously learns which combinations of signals most reliably indicate true media exposure.

The second function of the model is to determine whether the user's subsequent behavior—such as a retail purchase, store visit, app download, or online search—is attributable to the earlier media content exposure. Given the complex and often delayed nature of user action after viewing an ad, the system cannot rely on rigid rules. Instead, the system uses probabilistic modeling trained on historical user behavior to detect causality patterns.

For instance, if a user is shown an ad for a particular ice cream brand in the cinema and makes a purchase from that brand three days later at an off-site retail location, the system analyzes the temporal gap, the product-category match, and the user's historical likelihood of spontaneous vs. ad-driven purchases. If this behavior is atypical for the user or matches the conversion profile of other exposed users, the model assigns a higher confidence score. The model also accounts for multi-touch attribution: if the same user later receives a mobile push notification or sees a streaming ad for the same product, the model distributes attribution weight across all exposures based on recency, context, and historical effectiveness.

To refine accuracy, the model incorporates historical baselines for product conversion rates with and without media exposure, allowing it to filter out background behavior and isolate the effect of the specific ad campaign. Over time, this enables the system to build product- and demographic-specific conversion profiles that dynamically adapt to user behavior changes.

Another capability of the machine learning system is to proactively optimize media content campaigns based on the correlation results. Once the model identifies which exposures are most effective at generating conversions, it feeds that information back into a campaign optimization engine that can adjust:

Ad frequency (e.g., increase impressions of high-performing ads)

Ad placement (e.g., prioritize auditorium screenings with higher conversion lift)

Audience targeting (e.g., segment users most likely to respond to a given ad)

Scheduling (e.g., display ads closer to peak decision-making windows)

This optimization can be automated via a reinforcement learning loop, where the system tracks the performance of modified campaigns and adjusts further based on their measured lift. For instance, if showing an ad before horror films leads to higher post-exposure purchases of a specific beverage, the system may recommend extending or duplicating that placement across similar genres. Likewise, if users exposed to an ad via CTV after seeing it in the cinema exhibit higher conversion rates, the system increases the retargeting budget for that user group.

The model is trained using supervised learning, leveraging labeled datasets that indicate whether a prior ad exposure did or did not lead to a conversion. Features include ad type, placement, timing, device type, user demographic group, prior engagement patterns, and environmental context. As the system receives more real-world data, it retrains periodically to reflect new consumption patterns, emerging ad formats, and market shifts (e.g., seasonal behavior changes or new competitors).

In this way, the media content exposure tracking system applies advanced machine learning techniques to detect, quantify, and respond to real-world advertisement effectiveness, overcoming limitations of traditional rule-based systems and enabling cinema advertisers to derive measurable ROI from pre-screening media placements.

Although examples herein describe a media content exposure tracking system or a machine learning model as performing certain functions, it is appreciated that various operations can be performed interchangeably by either the system, the model, or a combination thereof.

The systems and methods described in this application include training a machine learning model to determine correlations between in-theater media content exposures and subsequent user behavior, such as purchases, location visits, or digital engagements. The machine learning model is trained to analyze structured ticket event data, media content scheduling information, geolocation history, and behavioral patterns to estimate whether a specific media content exposure—such as an advertisement played before a movie screening—likely influenced the user's post-exposure actions.

The system receives media content exposure data from multiple sources, including cinema advertisement servers, digital-out-of-home (DOOH) scheduling platforms, geofencing services, and third-party data aggregators. This exposure data is correlated with downstream user activity such as digital receipt records, mobile device location pings, loyalty program purchases, and browser/app interaction logs. By analyzing these datasets, the model is trained to learn causal and correlative relationships between in-cinema media exposures and real-world user responses across time and space.

The model learns from labeled training datasets that include examples of prior media content exposures tied to ticket events, paired with behavioral outcomes that either resulted in conversions (e.g., purchases of the advertised product) or did not. These training records include data points such as auditorium number, advertisement timestamp, user entry time, geofenced presence, and product engagement behavior. By identifying repeatable patterns across this data, the model distinguishes between coincidental user behavior and truly ad-driven conversions. To improve prediction accuracy, the model incorporates engagement-level features such as the frequency of exposure to a given campaign, duration of presence in the theater, or whether the user viewed additional reinforcements (e.g., via CTV or mobile retargeting).

The training of the artificial intelligence models used in this system is firmly rooted in computer technology. It requires the ingestion and normalization of massive volumes of structured data, including exposure logs, transaction metadata, location-based signals, and temporal behavior sequences. The model is refined using advanced optimization processes, such as gradient descent, backpropagation, and probabilistic error minimization, to assign appropriate weightings to the various input features. These computational techniques are executed on server-based infrastructure, often in cloud-hosted machine learning environments with support for parallelized training and real-time inference deployment.

Once trained, the machine learning model is deployed as part of the media content exposure tracking pipeline to improve attribution precision and reduce false positives. For example, if multiple advertisements were presented across several screens and time blocks, and the user exhibits purchase behavior hours or days later, the system uses the model to probabilistically infer the most likely causal chain. The model continues to adapt as new transaction, geolocation, and exposure data is received, ensuring that the system remains current with evolving user behavior and advertising formats.

By using machine learning to attribute exposure-driven behavior, the system enhances its ability to assess the true impact of cinema-based media content and allows for data-driven optimization of future content campaigns. These insights can be used to prioritize high-performing media placements, fine-tune target audience profiles, and allocate advertising budgets more effectively. As with other aspects of this system, operations attributed to the model may be performed by one or more other models, heuristics engines, or rule-based systems, depending on implementation.

Machine Architecture

Figure 5:
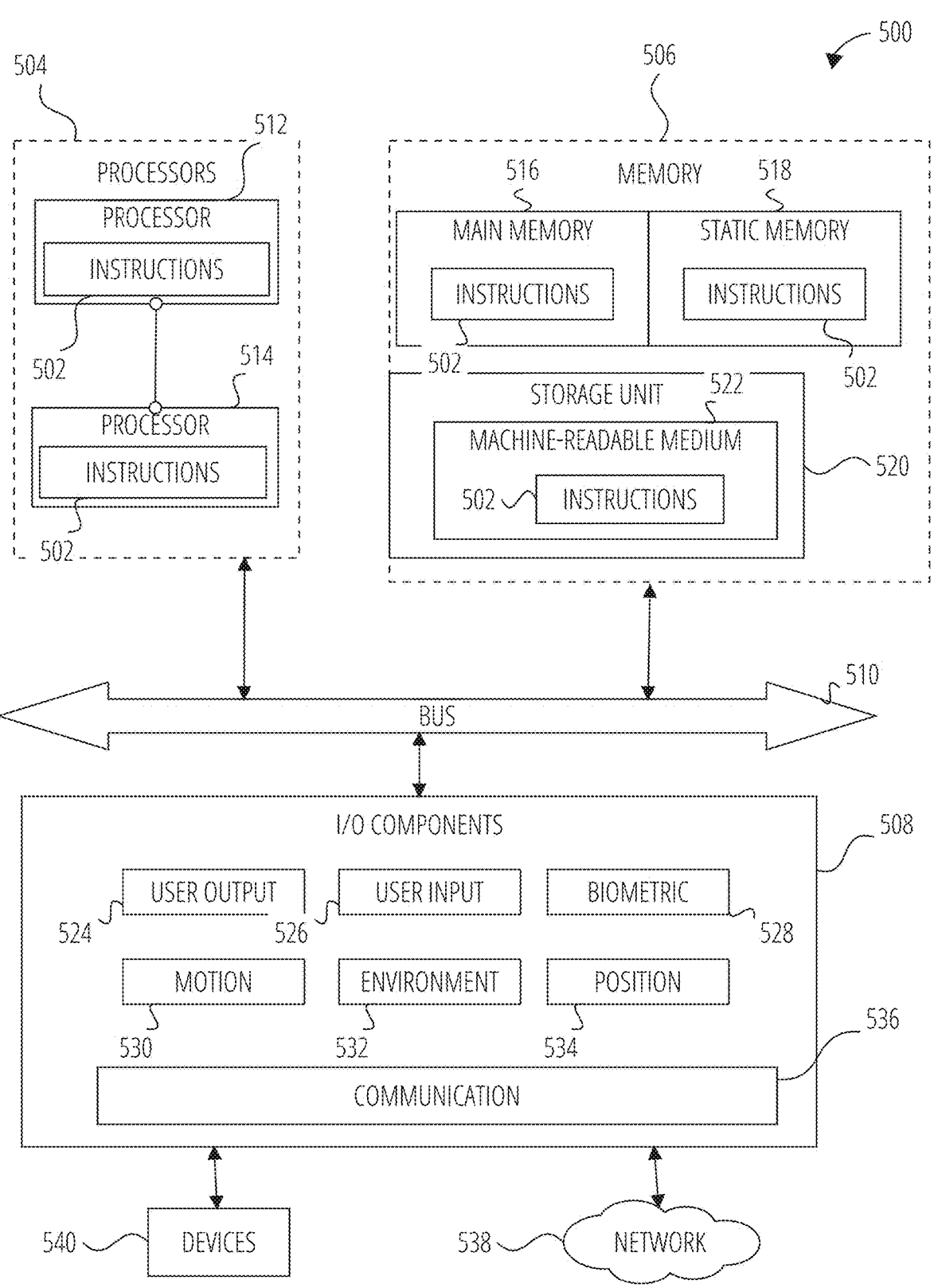
FIG. 5 is a diagrammatic representation of a machine in the form of a computer system within which a set of instructions may be executed to cause the machine to perform any one or more of the methodologies discussed herein, according to some examples.

FIG. 5 is a diagrammatic representation of the machine 500 within which instructions 502 (e.g., software, a program, an application, an applet, an app, or other executable code) for causing the machine 500 to perform any one or more of the methodologies discussed herein may be executed. For example, the instructions 502 may cause the machine 500 to execute any one or more of the methods described herein. The instructions 502 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, may comprise a user system or any one of multiple server devices forming part of the server system. In some examples, the machine 500 also comprises both client and server systems, with certain operations of a particular method or algorithm being performed on the server-side and with certain operations of the particular method or algorithm being performed on the client-side.

The machine 500 may include processors 504, memory 506, and input/output I/O components 508, which may be configured to communicate with each other via a bus 510. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that execute the instructions 502. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 516, a static memory 518, and a storage unit 520, both accessible to the processors 504 via the bus 510. The main memory 506, the static memory 518, and storage unit 520 store the instructions 502 embodying any one or more of the methodologies or functions described herein. The instructions 502 may also reside, completely or partially, within the main memory 516, within the static memory 518, within machine-readable medium 522 within the storage unit 520, within at least one of the processors 504 (e.g., within the processor's cache memory), or any suitable combination thereof, during execution thereof by the machine 500.

The I/O components 508 may include a wide variety of components to receive input, provide output, produce output, transmit information, exchange information, capture measurements, and so on. The specific I/O components 508 that are included in a particular machine will depend on the type of machine. For example, portable machines such as mobile phones may include a touch input device or other such input mechanisms, while a headless server machine will likely not include such a touch input device. It will be appreciated that the I/O components 508 may include many other components that are not shown in FIG. 5. In various examples, the I/O components 508 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 508 may include medical device components 628, motion components 530, environmental components 532, or position components 534, among a wide array of other components. For example, the medical device components 628 include components to detect data from medical devices, as further described herein.

The motion components 530 include acceleration sensor components (e.g., accelerometer), gravitation sensor components, rotation sensor components (e.g., gyroscope).

The environmental components 532 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

The position components 534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 508 further include communication components 536 operable to couple the machine 500 to a network 538 or devices 540 via respective coupling or connections. For example, the communication components 536 may include a network interface component or another suitable device to interface with the network 538. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 540 may be another machine or any of a wide variety of peripheral devices (e.g., a peripheral device coupled via a USB).

Moreover, the communication components 536 may detect identifiers or include components operable to detect identifiers. For example, the communication components 536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 516, static memory 518, and memory of the processors 504) and storage unit 520 may store one or more sets of instructions and data structures (e.g., software) embodying or used by any one or more of the methodologies or functions described herein. These instructions (e.g., the instructions 502), when executed by processors 504, cause various operations to implement the disclosed examples.

The instructions 502 may be transmitted or received over the network 538, using a transmission medium, via a network interface device (e.g., a network interface component included in the communication components 536) and using any one of several well-known transfer protocols (e.g., hypertext transfer protocol (HTTP)). Similarly, the instructions 502 may be transmitted or received using a transmission medium via a coupling (e.g., a peer-to-peer coupling) to the devices 540.

Software Architecture

Figure 6:
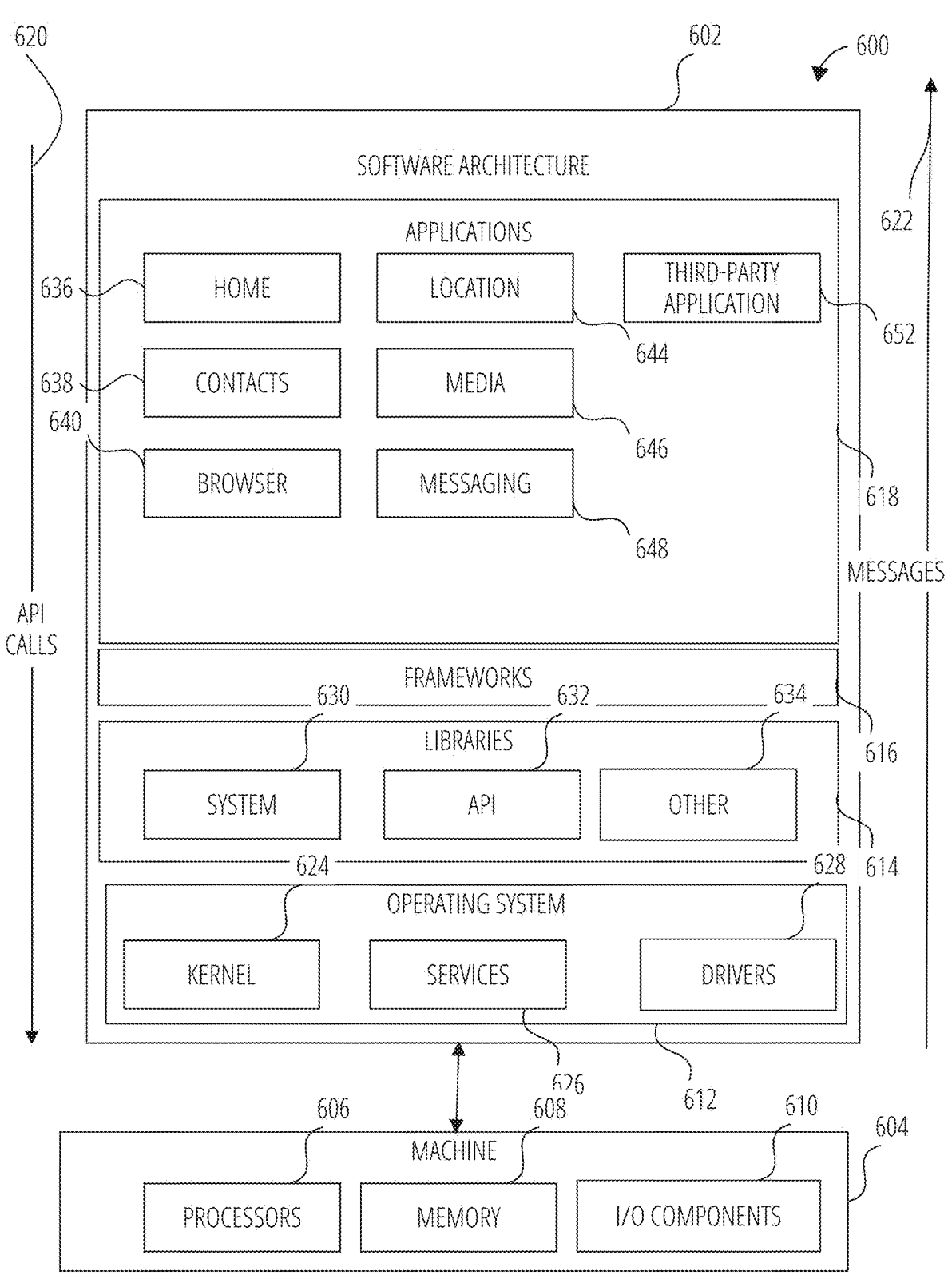
FIG. 6 is a block diagram showing a software architecture within which examples may be implemented.

FIG. 6 is a block diagram 600 illustrating a software architecture 602, which can be installed on any one or more of the devices described herein. The software architecture 602 is supported by hardware such as a machine 604 that includes processors 606, memory 608, and I/O components 610. In this example, the software architecture 602 can be conceptualized as a stack of layers, where each layer provides a particular functionality. The software architecture 602 includes layers such as an operating system 612, libraries 614, frameworks 616, and applications 618. Operationally, the applications 618 invoke API calls 620 through the software stack and receive messages 622 in response to the API calls 620.

The operating system 612 manages hardware resources and provides common services. The operating system 612 includes, for example, a kernel 624, services 626, and drivers 628. The kernel 624 acts as an abstraction layer between the hardware and the other software layers. For example, the kernel 624 provides memory management, processor management (e.g., scheduling), component management, networking, and security settings, among other functionalities. The services 626 can provide other common services for the other software layers. The drivers 628 are responsible for controlling or interfacing with the underlying hardware. For instance, the drivers 628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 614 provide a common low-level infrastructure used by the applications 618. The libraries 614 can include system libraries 630 (e.g., C standard library) that provide functions such as memory allocation functions, string manipulation functions, mathematic functions, and the like. In addition, the libraries 614 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 614 can also include a wide variety of other libraries 634 to provide many other APIs to the applications 618.

The frameworks 616 provide a common high-level infrastructure that is used by the applications 618. For example, the frameworks 616 provide various graphical user interface (GUI) functions, high-level resource management, and high-level location services. The frameworks 616 can provide a broad spectrum of other APIs that can be used by the applications 618, some of which may be specific to a particular operating system or platform.

In an example, the applications 618 may include a home application 636, a contacts application 638, a browser application 640, a location application 644, a media application 646, a messaging application 648, and a broad assortment of other applications such as a third-party application 652. The applications 618 are programs that execute functions defined in the programs. Various programming languages can be employed to create one or more of the applications 618, structured in a variety of manners, such as object-oriented programming languages (e.g., Objective-C, Java, or C++) or procedural programming languages (e.g., C or assembly language). In a specific example, the third-party application 652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 652 can invoke the API calls 620 provided by the operating system 612 to facilitate functionalities described herein.

Machine-Learning Pipeline

Figure 8:
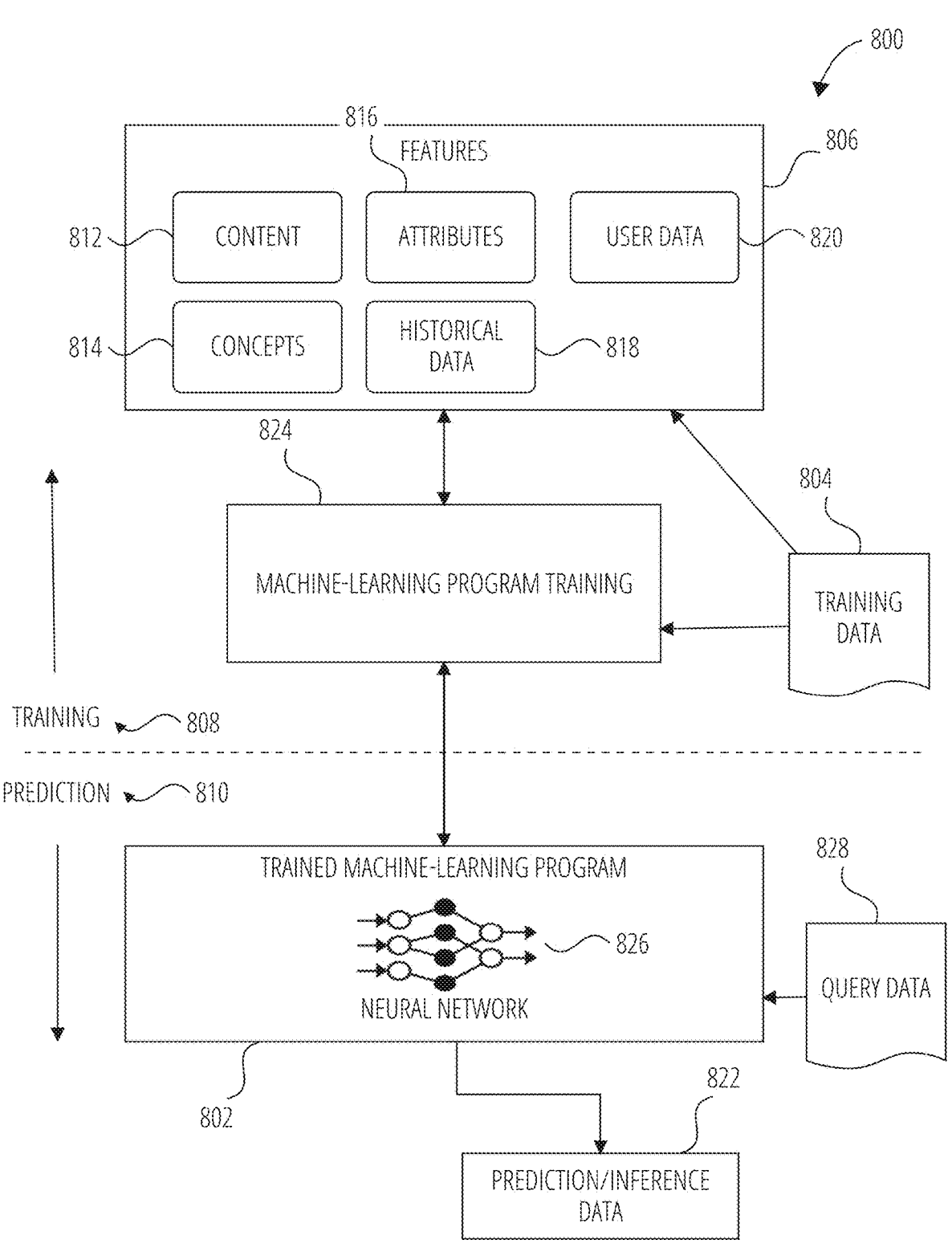
FIG. 8 illustrates training and use of a machine-learning program, according to some examples.

FIG. 8 is a flowchart depicting a machine-learning pipeline 800, according to some examples. The machine-learning pipelines 800 may be used to generate a trained model, for example the trained machine-learning program 802 of FIG. 8, described herein to perform operations associated with searches and query responses.

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Figure 7:
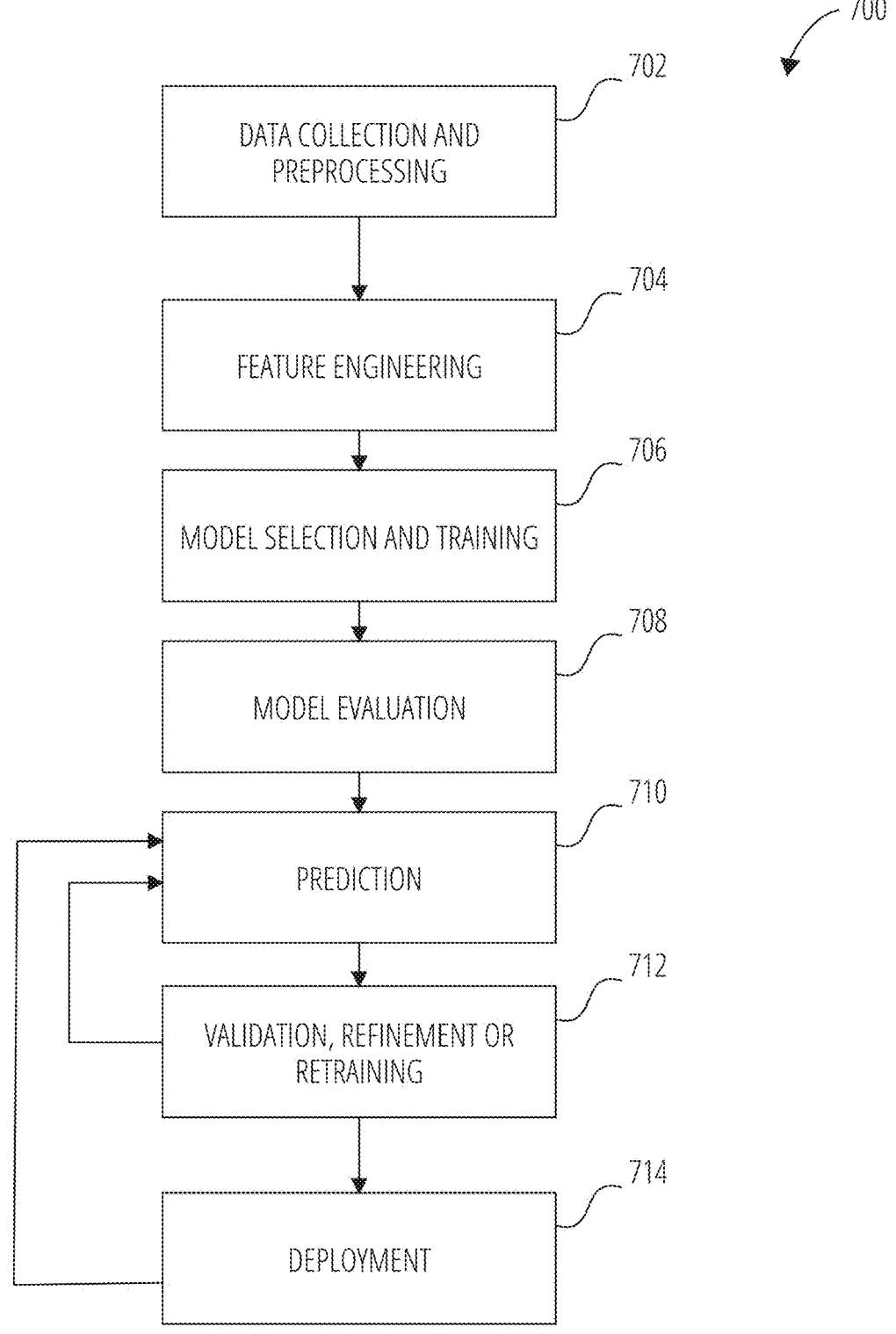
FIG. 7 illustrates a machine-learning pipeline, according to some examples.

Generating a trained machine-learning program 802 may include multiple types of phases that form part of the machine-learning pipeline 800, including for example the following phases 700 illustrated in FIG. 7:

Data collection and preprocessing 702: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering 704: This may include selecting and transforming the training data 804 to create features that are useful for predicting the target variable. Feature engineering may include (1) receiving features 806 (e.g., as structured or labeled data in supervised learning) and/or (2) identifying features 806 (e.g., unstructured or unlabeled data for unsupervised learning) in training data 804.

Model selection and training 706: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation 708: This may include evaluating the performance of a trained model (e.g., the trained machine-learning program 802) on a separate testing dataset. This can help determine if the model is overfitting or underfitting and if it is suitable for deployment.

Prediction 710: This involves using a trained model (e.g., trained machine-learning program 802) to generate predictions on new, unseen data.

Validation, refinement or retraining 712: This may include updating a model based on feedback generated from the prediction phase, such as new data or user feedback.

Deployment 714: This may include integrating the trained model (e.g., the trained machine-learning program 802) into a larger system or application, such as a web service, mobile app, or IoT device. This can involve setting up APIs, building a user interface, and ensuring that the model is scalable and can handle large volumes of data.

FIG. 8 illustrates two example phases, namely a training phase 808 (part of the model selection and trainings 806) and a prediction phase 810 (part of prediction 810). Prior to the training phase 808, feature engineering 804 is used to identify features 806. This may include identifying informative, discriminating, and independent features for the effective operation of the trained machine-learning program 802 in pattern recognition, classification, and regression. In some examples, the training data 804 includes labeled data, which is known data for pre-identified features 806 and one or more outcomes.

Each of the features 806 may be a variable or attribute, such as individual measurable property of a process, article, system, or phenomenon represented by a data set (e.g., the training data 804). Features 806 may also be of different types, such as numeric features, strings, vectors, matrices, encodings, and graphs, and may include one or more of content 812, concepts 814, attributes 816, historical data 818 and/or user data 820, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 808, the machine-learning pipeline 800 uses the training data 804 to find correlations among the features 806 that affect a predicted outcome or prediction/inference data 822.

With the training data 804 and the identified features 806, the trained machine-learning program 802 is trained during the training phase 808 during machine-learning program training 824. The machine-learning program training 824 appraises values of the features 806 as they correlate to the training data 804. The result of the training is the trained machine-learning program 802 (e.g., a trained or learned model).

Further, the training phase 808 may involve machine learning, in which the training data 804 is structured (e.g., labeled during preprocessing operations), and the trained machine-learning program 802 implements a relatively simple neural network 826 capable of performing, for example, classification and clustering operations. In other examples, the training phase 808 may involve deep learning, in which the training data 804 is unstructured, and the trained machine-learning program 802 implements a deep neural network 826 that is able to perform both feature extraction and classification/clustering operations.

A neural network 826, in some examples, is generated during the training phase 808, and implemented within the trained machine-learning program 802. The neural network 826 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 826 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 826 also is one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 808, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 826 is iteratively trained by adjusting model parameters to minimize a specific loss function or maximize a certain objective. The system can continue to train the neural network 826 by adjusting parameters based on the output of the validation, refinement, or retraining block 812, and rerun the prediction 810 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 826 even after deployment 814 of the neural network 826. The neural network 826 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 810, the trained machine-learning program 802 uses the features 806 for analyzing query data 828 to generate inferences, outcomes, or predictions, as examples of a prediction/inference data 822. For example, during prediction phase 810, the trained machine-learning program 802 is used to generate an output. Query data 828 is provided as an input to the trained machine-learning program 802, and the trained machine-learning program 802 generates the prediction/inference data 822 as output, responsive to receipt of the query data 828. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 802 is a generative AI model. Generative AI is a term that may refer to any type of artificial intelligence that can create new content from training data 804. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 822 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method performed by one or more hardware processors, the method comprising: accessing ticket event data associated with a user, the ticket event data indicating a purchase of a cinema ticket for a specific theater location; accessing media content schedule data indicating a schedule for displaying media content at the specific theater location, the media content associated with a good or service; determining a media content exposure indicating that the user was likely exposed to the media content shown at the specific theater location; accessing a post-exposure event associated with the user, the post-exposure event comprising data indicating a transaction associated with the good or service; correlating the media content exposure with the post-exposure event to determine an influence factor of the media content in a behavior of the user; and optimizing a media content campaign based on the correlation.

In Example 2, the subject matter of Example 1 includes, wherein the ticket event data comprises a receipt from a digital ticketing platform or point-of-sale system that is scanned by a device of the user.

In Example 3, the subject matter of Examples 1-2 includes, wherein determining the media content exposure comprises comparing a scheduled showtime associated with the ticket event data to a time period of a scheduled display for the media content based on the media content schedule data.

In Example 4, the subject matter of Examples 1-3 includes, wherein determining that the user was likely exposed to the media content comprises accessing location data from a mobile device associated with the user, the location data indicating that the mobile device was within a geofenced boundary of the specific theater location during a scheduled display for the media content based on the media content schedule data.

In Example 5, the subject matter of Examples 1-4 includes, wherein determining that the user was likely exposed to the media content comprises accessing entry log data from a theater device, the entry log data indicating a digital ticket scan or in-app check-in associated with the user at the specific theater location and during a scheduled display for the media content based on the media content schedule data.

In Example 6, the subject matter of Examples 1-5 includes, wherein determining that the user was likely exposed to the media content further comprises validating a presence of the user at the specific theater location based on a transaction associated with the user within the specific theater location and occurring within a time window corresponding to a scheduled display for the media content based on the media content schedule data.

In Example 7, the subject matter of Examples 1-6 includes, wherein determining that the user was likely exposed to the media content further comprises linking the ticket event data to an auditorium identifier within the theater, and using the auditorium identifier to match a scheduled display for the media content associated with the user.

In Example 8, the subject matter of Examples 1-7 includes, wherein the post-exposure event comprises receipt data indicating a purchase of the good or service associated with the media content, the receipt data recorded on a date subsequent to a scheduled showing of the media content.

In Example 9, the subject matter of Examples 1-8 includes, wherein the post-exposure event comprises receipt data indicating that the user purchased the good or service at a third-party merchant location external to the theater location.

In Example 10, the subject matter of Examples 1-9 includes, wherein the post-exposure event comprises geo-location data of the user indicating that the user visited a physical retail location associated with the good or service within a predefined time window after the media content was shown.

In Example 11, the subject matter of Examples 1-10 includes, wherein the post-exposure event comprises digital activity data, including browser history or app interaction logs, indicating that the user searched for, viewed, or engaged with information related to the good or service after a scheduled showing of the media content.

In Example 12, the subject matter of Examples 1-11 includes, wherein optimizing the media content campaign comprises initiating a new media content campaign for the user based on the determined influence factor.

In Example 13, the subject matter of Examples 1-12 includes, wherein optimizing the media content campaign comprises modifying a retargeting strategy for the user, the retargeting strategy comprising displaying follow-up media content via a mobile application, a television platform, or a web browser based on the prior media content exposure.

In Example 14, the subject matter of Examples 1-13 includes, wherein optimizing the media content campaign comprises initiating an order for additional advertisements to be displayed at the specific theater location associated with the media content based on the determined influence factor.

In Example 15, the subject matter of Examples 1-14 includes, wherein the media content exposure is determined using a machine learning model to determine that the user was likely exposed to the media content based on inputting the ticket event data and the media content schedule data into the machine learning model.

In Example 16, the subject matter of Examples 1-15 includes, wherein the post-exposure event is correlated using a machine learning model to determine the influence factor based on inputting the media content exposure and the post-exposure event into the machine learning model.

In Example 17, the subject matter of Examples 1-16 includes, wherein the media content campaign is optimized using a machine learning model to based on inputting the influence factor into the machine learning model.

In Example 18, the subject matter of Examples 1-17 includes, wherein the media content schedule data includes dynamic targeting parameters associated with an expected audience profile, and wherein optimizing the media content campaign comprises adjusting future media content blocks based on a correlation between audience profile and post-exposure behavior.

Example 19 is a system comprising: at least one processor; and at least one memory component storing instructions that, when executed by the at least one processor, cause the at least one processor to perform operations comprising: accessing ticket event data associated with a user, the ticket event data indicating a purchase of a cinema ticket for a specific theater location; accessing media content schedule data indicating a schedule for displaying media content at the specific theater location, the media content associated with a good or service; determining a media content exposure indicating that the user was likely exposed to the media content shown at the specific theater location; accessing a post-exposure event associated with the user, the post-exposure event comprising data indicating a transaction associated with the good or service; correlating the media content exposure with the post-exposure event to determine an influence factor of the media content in a behavior of the user; and optimize a media content campaign based on the correlation.

Example 20 is a non-transitory computer-readable storage medium storing instructions that, when executed by at least one processor, cause the at least one processor to perform operations comprising: accessing ticket event data associated with a user, the ticket event data indicating a purchase of a cinema ticket for a specific theater location; accessing media content schedule data indicating a schedule for displaying media content at the specific theater location, the media content associated with a good or service; determining a media content exposure indicating that the user was likely exposed to the media content shown at the specific theater location; accessing a post-exposure event associated with the user, the post-exposure event comprising data indicating a transaction associated with the good or service; correlating the media content exposure with the post-exposure event to determine an influence factor of the media content in a behavior of the user; and optimize a media content campaign based on the correlation.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

In the example embodiments, it should be understood that the NFT system, the NFT system, and the various devices may be implemented in other manners. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the example embodiments may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of example embodiments may be implemented in the form of a software product. The software product is stored in a storage medium, and includes several instructions for instructing a computing device to perform all or some of the steps or processes of the methods described in the example embodiments. The foregoing storage medium includes any medium that can store program code, such as a universal serial bus flash drive, removable hard disk, read only memory, random access memory, magnetic disc, and/or an optical disc.

In the described methods or block diagrams, boxes may represent events, steps, functions, processes, modules, messages, and/or state based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps describe herein may be separated into a number of sub-messages or sub-steps in other embodiments. Even further, some or all of the steps may be repeated, as necessary. Elements described as methods, steps, or processes similarly apply to systems, subsystems, or subcomponents, and vice versa. Reference to such a word as sending or receiving could be interchanged depending on the perspective of the particulars device. The described embodiments are considered to be illustrative and not restrictive. Example embodiments described as methods would similarly apply to systems, subsystems, or devices, and vice versa.

The various example embodiments are merely examples and are in no way meant to limit the scope of this disclosure. Variations of the innovations describe herein will be apparent to persons of ordinary skill in the art, such variations being within the intended scope. In particular features from one or more of the example embodiments may be selected to create alternative embodiments comprised of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent a person skilled in the art. The subject matter describe herein intends to cover all suitable changes in technology.

What is claimed is:

1. A method performed by one or more hardware processors, the method comprising:

accessing ticket event data associated with a user, the ticket event data indicating a purchase of a cinema ticket for a specific theater location;

accessing media content schedule data indicating a schedule for displaying media content at the specific theater location, the media content associated with a good or service;

determining a media content exposure indicating that the user was likely exposed to the media content shown at the specific theater location by inputting the ticket event data associated with movie showing schedule data and the media content schedule data into a machine learning model and the machine learning model being trained to determine the media content exposure based on the inputted ticket event data and the media content schedule data, the media content schedule data being different than the movie showing schedule data;

accessing a post-exposure event associated with the user, the post-exposure event comprising data indicating a transaction associated with the good or service;

correlating the media content exposure with the post-exposure event to determine an influence factor of the media content in a behavior of the user; and optimizing an electronic media content bidding campaign based on the influence factor of the media content in the behavior of the user.

2. The method of claim 1, wherein the ticket event data comprises a receipt from a digital ticketing platform or point-of-sale system that is scanned by a device of the user.

3. The method of claim 1, wherein determining the media content exposure comprises comparing a scheduled showtime of a movie associated with the ticket event data to a time period of a scheduled display for the media content that includes an advertisement based on the media content schedule data, wherein the movie is different than the media content.

4. The method of claim 1, wherein determining that the user was likely exposed to the media content comprises accessing location data from a mobile device associated with the user, the location data indicating that the mobile device was within a geofence of the specific theater location during a scheduled display for the media content based on the media content schedule data.

5. The method of claim 1, wherein determining that the user was likely exposed to the media content comprises accessing entry log data from a theater device, the entry log data indicating a digital ticket scan or in-app check-in associated with the user at the specific theater location and during a scheduled display for the media content based on the media content schedule data.

6. The method of claim 1, wherein determining that the user was likely exposed to the media content further comprises validating a presence of the user at the specific theater location and during the scheduled display for the media content based on a transaction associated with the user occurring (1) within the specific theater location and (2) occurring within a time window corresponding to a scheduled display for the media content based on the media content schedule data, the scheduled display for the media content item being different than a movie corresponding to the cinema ticket.

7. The method of claim 1, wherein determining that the user was likely exposed to the media content further comprises determining a probability of exposure based on (1) linking the ticket event data to indicating an auditorium identifier within the theater and (2) a scheduled display for the media content to a particular auditorium identifier associated with the user.

8. The method of claim 1, wherein the post-exposure event comprises receipt data indicating a purchase of the good or service associated with the media content, the receipt data recorded on a date subsequent to a scheduled showing of the media content.

9. The method of claim 1, wherein the post-exposure event comprises receipt data indicating that the user purchased the good or service at a third-party merchant location external to a location for the theater.

10. The method of claim 1, wherein the post-exposure event comprises geolocation data of the user indicating that the user visited a physical retail location associated with the good or service within a predefined time window after the media content was shown.

11. The method of claim 1, wherein the post-exposure event comprises digital activity data, including browser history or app interaction logs, indicating that the user searched for, viewed, or engaged with information related to the good or service after a scheduled showing of the media content, the media content was displayed in an environment lacking pixel, cookie, or embedded tracking features to directly confirm a user's exposure.

12. The method of claim 1, wherein optimizing the media content campaign comprises initiating a new media content campaign for the user based on the determined influence factor.

13. The method of claim 1, wherein optimizing the media content campaign comprises modifying a retargeting strategy for the user, the retargeting strategy comprising displaying follow-up media content via a mobile application, a television platform, or a web browser based on the prior media content exposure.

14. The method of claim 1, wherein optimizing the media content campaign comprises initiating an order for additional advertisements to be displayed at the specific theater location associated with the media content based on the determined influence factor.

15. The method of claim 1, wherein the media content exposure is determined using a machine learning model to determine that the user was likely exposed to the media content based on inputting the ticket event data and the media content schedule data into the machine learning model.

16. The method of claim 1, wherein the post-exposure event is correlated using a machine learning model to determine the influence factor based on inputting the media content exposure and the post-exposure event into the machine learning model.

17. The method of claim 1, wherein the media content campaign is optimized using a machine learning model to based on inputting the influence factor into the machine learning model.

18. The method of claim 1, wherein the media content schedule data includes dynamic targeting parameters associated with an expected audience profile, and wherein optimizing the media content campaign comprises adjusting future media content blocks based on a correlation between audience profile and post-exposure behavior.

19. A system comprising:
at least one processor; and
at least one memory component storing instructions that, when executed by the at least one processor, cause the at least one processor to perform operations comprising:
accessing ticket event data associated with a user, the ticket event data indicating a purchase of a cinema ticket for a specific theater location;
accessing media content schedule data indicating a schedule for displaying media content at the specific theater location, the media content associated with a good or service;
determining a media content exposure indicating that the user was likely exposed to the media content shown at the specific theater location by inputting the ticket event data associated with movie showing schedule data and the media content schedule data into a machine learning model and the machine learning model being trained to determine the media content exposure based on the inputted ticket event data and the media content schedule data, the media content schedule data being different than the movie showing schedule data;
accessing a post-exposure event associated with the user, the post-exposure event comprising data indicating a transaction associated with the good or service;
correlating the media content exposure with the post-exposure event to determine an influence factor of the media content in a behavior of the user; and
optimizing an electronic media content bidding campaign based on the influence factor of the media content in the behavior of the user.

20. A non-transitory computer-readable storage medium storing instructions that, when executed by at least one processor, cause the at least one processor to perform operations comprising:
accessing ticket event data associated with a user, the ticket event data indicating a purchase of a cinema ticket for a specific theater location;
accessing media content schedule data indicating a schedule for displaying media content at the specific theater location, the media content associated with a good or service;
determining a media content exposure indicating that the user was likely exposed to the media content shown at the specific theater location by inputting the ticket event data associated with movie showing schedule data and the media content schedule data into a machine learning model and the machine learning model being trained to determine the media content exposure based on the inputted ticket event data and the media content schedule data, the media content schedule data being different than the movie showing schedule data;
accessing a post-exposure event associated with the user, the post-exposure event comprising data indicating a transaction associated with the good or service;
correlating the media content exposure with the post-exposure event to determine an influence factor of the media content in a behavior of the user; and
optimizing an electronic media content bidding campaign based on the influence factor of the media content in the behavior of the user.

* * * * *